(12) United States Patent
Hwang et al.

(10) Patent No.: US 12,267,820 B2
(45) Date of Patent: *Apr. 1, 2025

(54) INFORMATION ON SIDELINK RESOURCE

(71) Applicant: LG ELECTRONICS INC., Seoul (KR)

(72) Inventors: Daesung Hwang, Seoul (KR); Hanbyul Seo, Seoul (KR); Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/430,337

(22) Filed: Feb. 1, 2024

(65) Prior Publication Data

US 2024/0172196 A1 May 23, 2024

Related U.S. Application Data

(63) Continuation of application No. 17/436,462, filed as application No. PCT/KR2020/003042 on Mar. 4, 2020, now Pat. No. 11,937,218.

(60) Provisional application No. 62/916,787, filed on Oct. 17, 2019.

(30) Foreign Application Priority Data

Mar. 4, 2019 (KR) .................. 10-2019-0024872

(51) Int. Cl.
*H04W 72/0446* (2023.01)
*H04L 5/14* (2006.01)
*H04W 4/40* (2018.01)

(52) U.S. Cl.
CPC .......... *H04W 72/0446* (2013.01); *H04L 5/14* (2013.01); *H04W 4/40* (2018.02)

(58) Field of Classification Search
None
See application file for complete search history.

(56) References Cited

U.S. PATENT DOCUMENTS

2020/0236656 A1 * 7/2020 Cao .................. H04W 76/27

* cited by examiner

*Primary Examiner* — Zewdu A Beyen
(74) *Attorney, Agent, or Firm* — BRYAN CAVE LEIGHTON PAISNER LLP

(57) ABSTRACT

One embodiment of the present disclosure provides a method for transmitting, by a first device, information on an SL resource. The method comprises the steps of: receiving, from a base station, TDD-UL-DL configuration information; obtaining information on an SL resource, on the basis of the TDD-UL-DL configuration information; and transmitting, to a second device over a PSBCH, the information on the SL resource.

20 Claims, 26 Drawing Sheets

FIG. 4
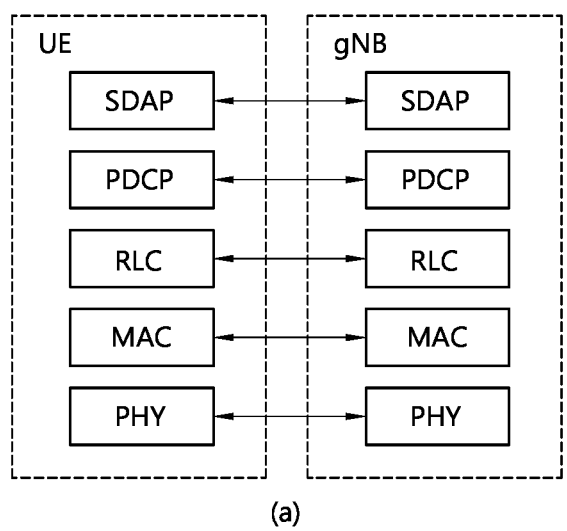
(a)
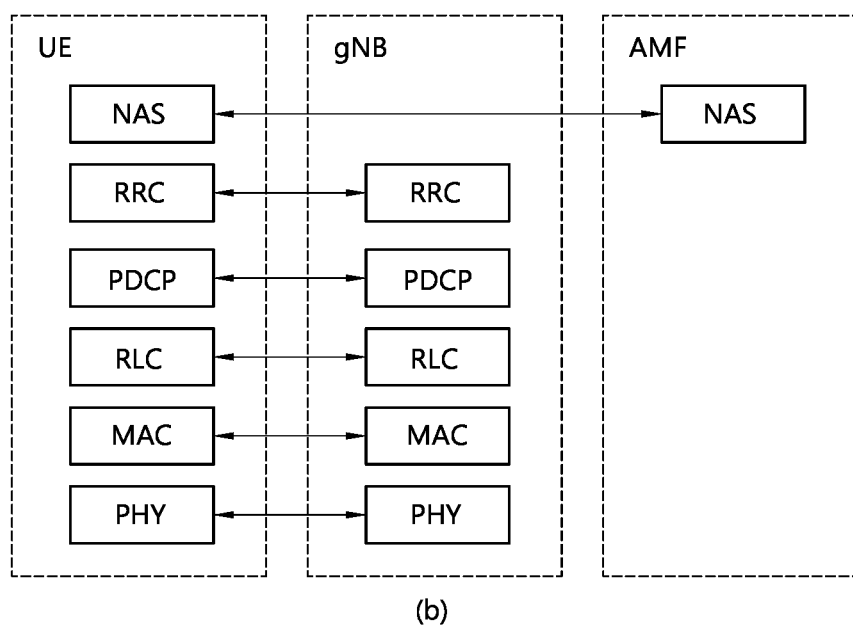
(b)

FIG. 8
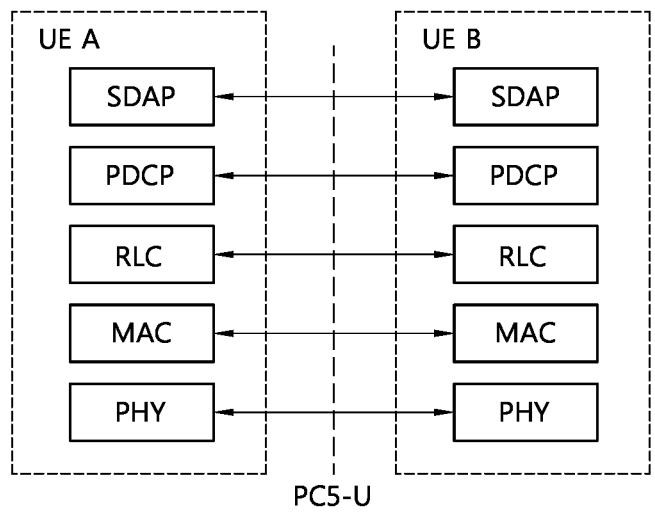
(a)
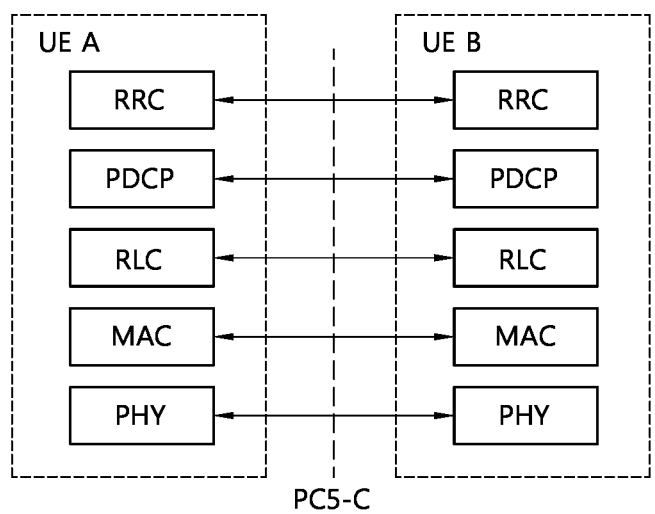
(b)

INFORMATION ON SIDELINK RESOURCE

CROSS-REFERENCE TO RELATED APPLICATIONS

This application is a Continuation of U.S. application Ser. No. 17/436,462, filed on Sep. 3, 2021, which is the National Stage filing under 35 U.S.C. 371 of International Application No. PCT/KR2020/003042, filed on Mar. 4, 2020, which claims the benefit of and priority to Korean Patent Application No. 10-2019-0024872, filed on Mar. 4, 2019 and U.S. Provisional Application No. 62/916,787, filed on Oct. 17, 2019, the contents of which are all hereby incorporated by reference herein in their entirety.

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (CNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as BSM (Basic Safety Message), CAM (Cooperative Awareness Message), and DENM (Decentralized Environmental Notification Message) is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include dynamic state information of the vehicle such as direction and speed, static data of the vehicle such as a size, and basic vehicle information such as an exterior illumination state, route details, or the like. For example, the UE may broadcast the CAM, and latency of the CAM may be less than 100 ms. For example, the UE may generate the DENM and transmit it to another UE in an unexpected situation such as a vehicle breakdown, accident, or the like. For example, all vehicles within a transmission range of the UE may receive the CAM and/or the DENM. In this case, the DENM may have a higher priority than the CAM.

Thereafter, regarding V2X communication, various V2X scenarios are proposed in NR. For example, the various V2X scenarios may include vehicle platooning, advanced driving, extended sensors, remote driving, or the like.

For example, based on the vehicle platooning, vehicles may move together by dynamically forming a group. For example, in order to perform platoon operations based on the vehicle platooning, the vehicles belonging to the group may receive periodic data from a leading vehicle. For example, the vehicles belonging to the group may decrease or increase an interval between the vehicles by using the periodic data.

For example, based on the advanced driving, the vehicle may be semi-automated or fully automated. For example, each vehicle may adjust trajectories or maneuvers, based on data obtained from a local sensor of a proximity vehicle and/or a proximity logical entity. In addition, for example, each vehicle may share driving intention with proximity vehicles.

For example, based on the extended sensors, raw data, processed data, or live video data obtained through the local sensors may be exchanged between a vehicle, a logical entity, a UE of pedestrians, and/or a V2X application server. Therefore, for example, the vehicle may recognize a more improved environment than an environment in which a self-sensor is used for detection.

For example, based on the remote driving, for a person who cannot drive or a remote vehicle in a dangerous environment, a remote driver or a V2X application may operate or control the remote vehicle. For example, if a route is predictable such as public transportation, cloud computing based driving may be used for the operation or control of the remote vehicle. In addition, for example, an access for a cloud-based back-end service platform may be considered for the remote driving.

Meanwhile, a scheme of specifying service requirements for various V2X scenarios such as vehicle platooning, advanced driving, extended sensors, remote driving, or the like is discussed in NR-based V2X communication.

SUMMARY OF THE DISCLOSURE

A technical problem of the present disclosure is to provide a method for communication between apparatuses (or terminals) based on V2X communication, and the apparatuses (or terminals) performing the method.

Another technical problem of the present disclosure is to provide a method for performing groupcast communication between apparatuses based on V2X communication in a wireless communication system and an apparatus for performing the same.

The other technical problem of the present disclosure is to provide a method and an apparatus for obtaining information on SL resources based on TDD-UL-DL (Time Division Duplex-Uplink-Downlink) configuration information received from a base station.

According to an embodiment of the present disclosure, a method of transmitting information on a sidelink (SL) resource by a first apparatus may be provided. The method may include receiving time division duplex-uplink-downlink (TDD-UL-DL) configuration information from a base station, obtaining information on an SL resource based on the TDD-UL-DL configuration information and transmitting the information on the SL resource to a second apparatus through a physical sidelink broadcast channel (PSBCH).

According to an embodiment of the present disclosure, a first apparatus transmitting information on an SL resource may be provided. The first apparatus may include at least one memory storing instructions, at least one transceiver and at least one processor connecting the at least one memory and the at least one transceiver, wherein the at least one processor is configured to: control the at least one transceiver to receive time division duplex-uplink-downlink (TDD-UL-DL) configuration information from a base station, obtain information on an SL resource based on the TDD-UL-DL configuration information, and control the at least one transceiver to transmit the information on the SL resource to a second apparatus through a physical sidelink broadcast channel (PSBCH).

According to an embodiment of the present disclosure, an apparatus (or chip(set)) controlling a first terminal may be provided. The apparatus includes at least one processor and at least one computer memory operably coupled by the at least one processor and storing instructions, wherein, by the at least one processor executing the instructions, the first terminal is configured to: receive time division duplex-uplink-downlink (TDD-UL-DL) configuration information from a base station, obtain information on an SL resource based on the TDD-UL-DL configuration information, and transmit the information on the SL resource to a second apparatus through a physical sidelink broadcast channel (PSBCH).

According to an embodiment of the present disclosure, a non-transitory computer-readable storage medium having instructions stored thereon may be provided. Based on the instructions being executed by at least one processor: time division duplex-uplink-downlink (TDD-UL-DL) configuration information is received by a first apparatus from a base station, information on an SL resource is obtained by the first apparatus based on the TDD-UL-DL configuration information, and the information on the SL resource is transmitted by the first apparatus to a second apparatus through a physical sidelink broadcast channel (PSBCH).

According to an embodiment of the present disclosure, a method of receiving information on an SL resource by a second apparatus may be provided. The method may include receiving information on an SL resource from a first apparatus through a physical sidelink broadcast channel (PSBCH) and determining the SL resource based on the information on the SL resource, wherein the information on the SL resource is based on TDD-UL-DL configuration information that is received by the first apparatus from a base station.

According to an embodiment of the present disclosure, a second apparatus receiving information on an SL resource may be provided. The second apparatus includes at least one memory storing instructions, at least one transceiver and at least one processor connecting the at least one memory and the at least one transceiver, wherein the at least one processor is configured to: control the at least one transceiver to receive information on an SL resource from a first apparatus through a physical sidelink broadcast channel (PSBCH), and determine the SL resource based on the information on the SL resource, wherein the information on the SL resource is based on TDD-UL-DL configuration information that is received by the first apparatus from a base station.

According to the present disclosure, a terminal (or an apparatus) may perform SL communication effectively.

According to the present disclosure, V2X communication between apparatuses (or terminals) may be performed effectively.

According to the present disclosure, information on an SL resource may be obtained efficiently based on TDD-UL-DL configuration information received from a base station.

BRIEF DESCRIPTION OF THE DRAWINGS

FIG. 4 shows a radio protocol architecture, in accordance with an embodiment of the present disclosure.

FIG. 8 shows a radio protocol architecture for a SL communication, in accordance with an embodiment of the present disclosure.

DESCRIPTION OF EXEMPLARY EMBODIMENTS

Figure 1:
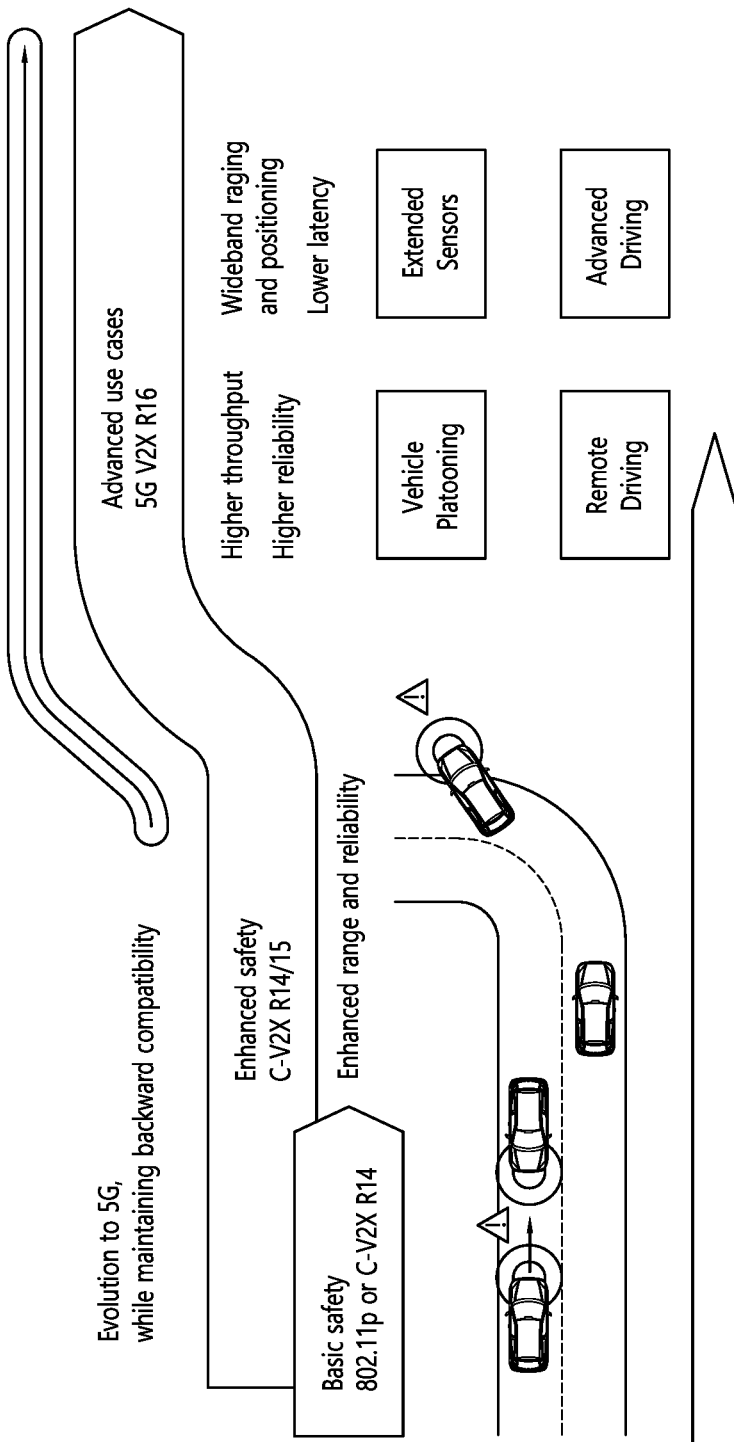
FIG. 1 is a drawing for describing V2X communication based on NR, compared to V2X communication based on RAT used before NR.

In the present specification, "A or B" may mean "only A", "only B" or "both A and B." In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDDCH" may be proposed as an example of the "control information". In addition, when indicated as "control information (i.e., PDCCH)", it may also mean that "PDCCH" is proposed as an example of the "control information".

A technical feature described individually in one figure in the present specification may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
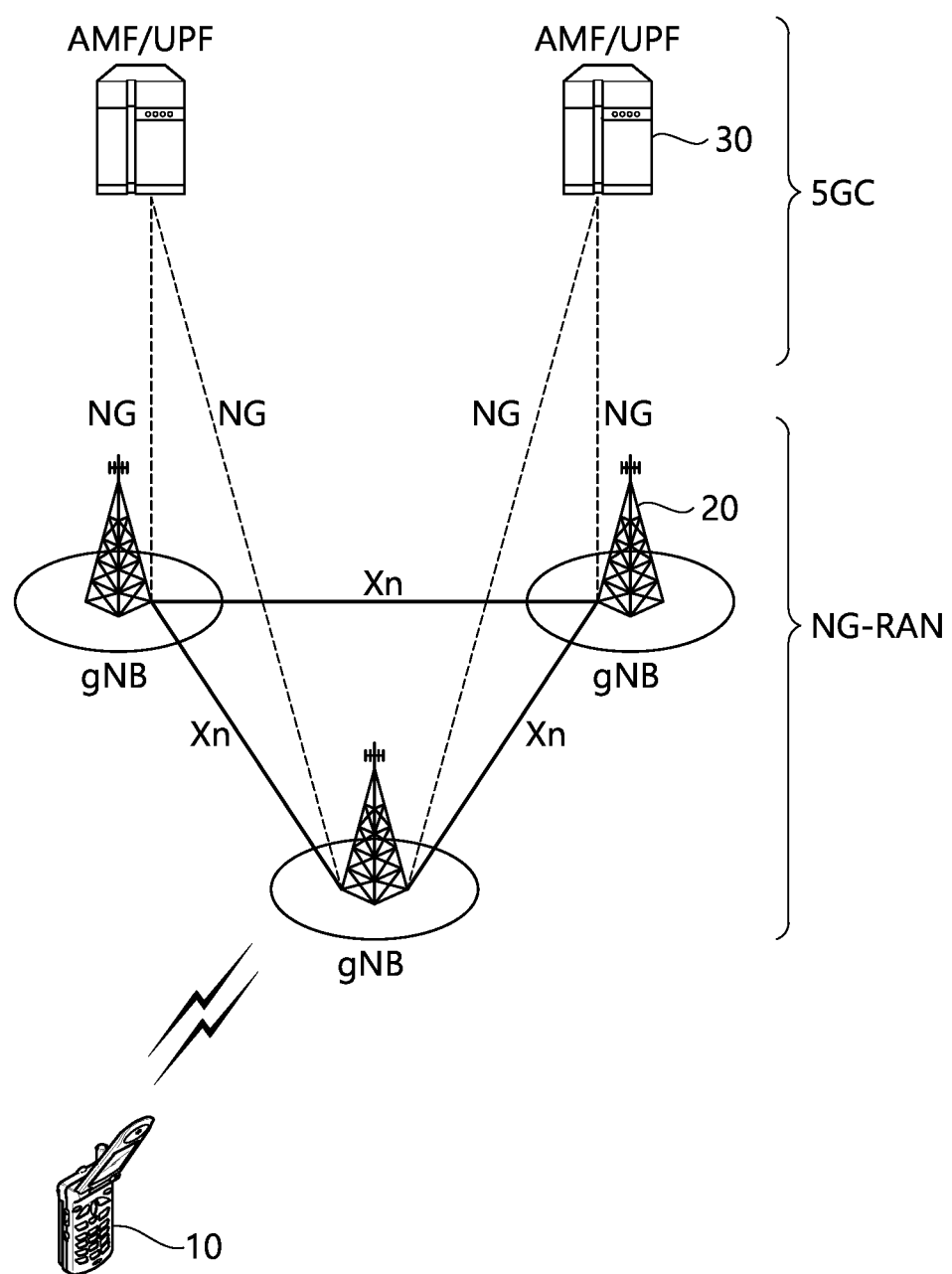
FIG. 2 shows a structure of an NR system, in accordance with an embodiment of the present disclosure.

FIG. 2 shows a structure of an NR system, in accordance with an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Figure 3:
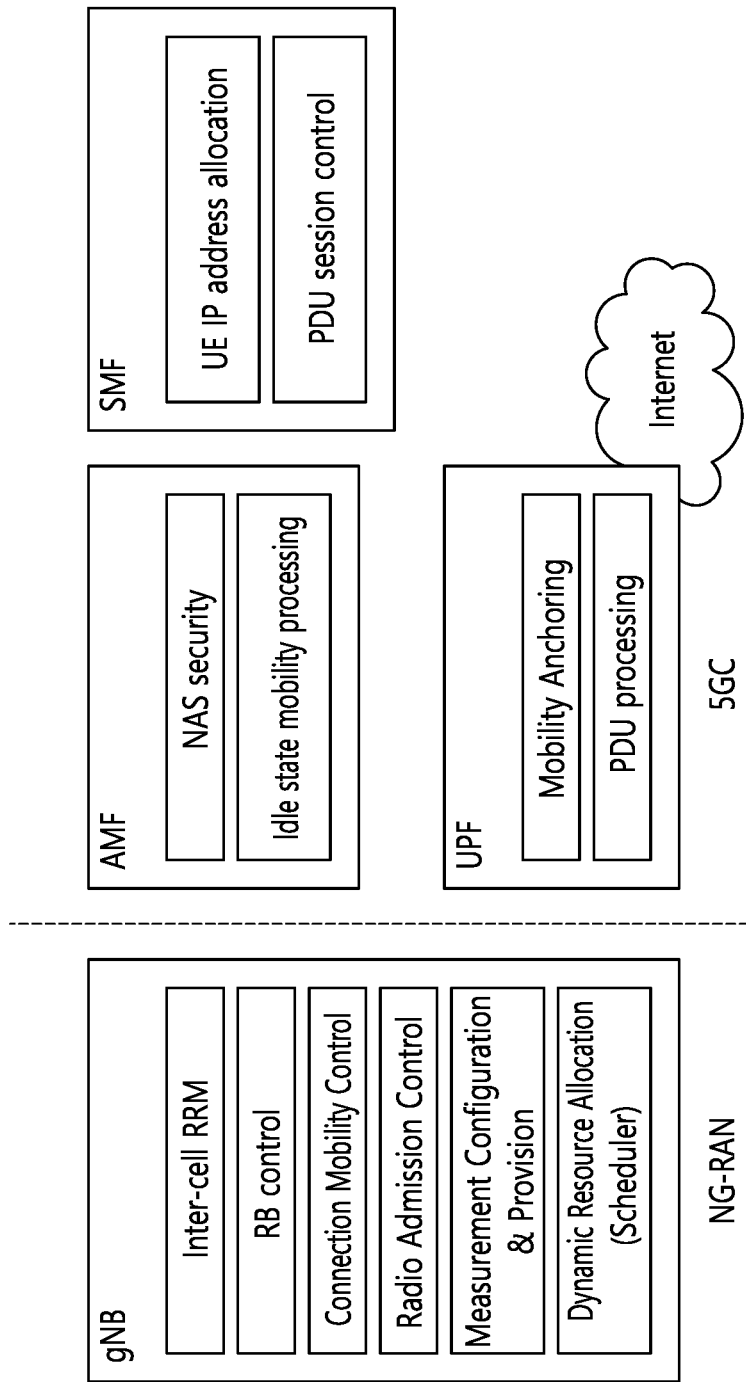
FIG. 3 shows a functional division between an NG-RAN and a 5GC, in accordance with an embodiment of the present disclosure.

FIG. 3 shows a functional division between an NG-RAN and a 5GC, in accordance with an embodiment of the present disclosure.

Referring to FIG. 3, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS)

security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

FIG. 4 shows a radio protocol architecture, in accordance with an embodiment of the present disclosure. The embodiment of FIG. 4 may be combined with various embodiments of the present disclosure. Specifically, (a) of FIG. 4 shows a radio protocol architecture for a user plane, and (b) of FIG. 4 shows a radio protocol architecture for a control plane. The user plane corresponds to a protocol stack for user data transmission, and the control plane corresponds to a protocol stack for control signal transmission.

Referring to FIG. 4, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QOS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QOS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each sub-frame may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Figure 5:
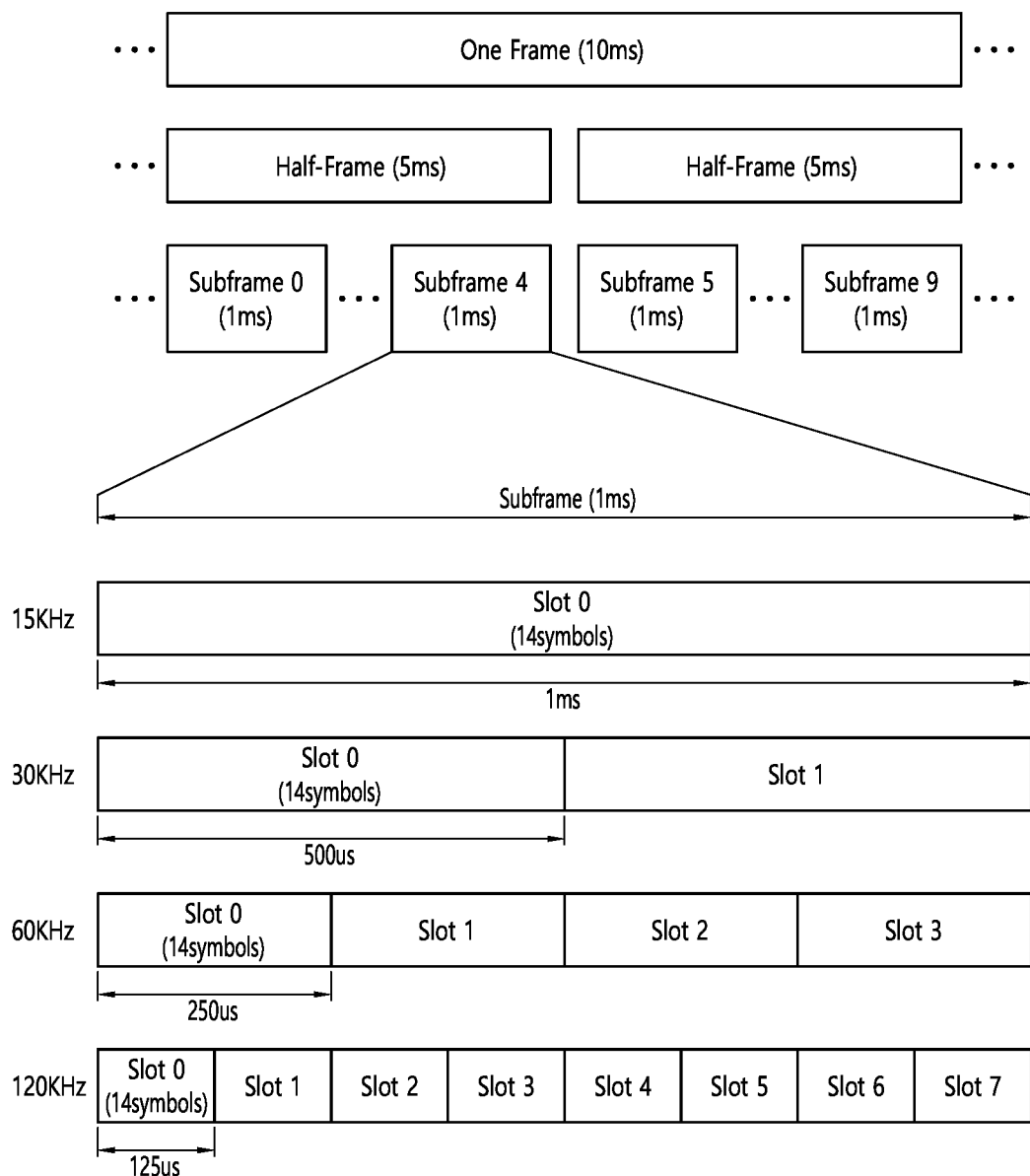
FIG. 5 shows a structure of a wireless frame of an NR, in accordance with an embodiment of the present disclosure.

FIG. 5 shows a structure of an NR system, in accordance with an embodiment of the present disclosure. The embodiment of FIG. 5 may be combined with various embodiments of the present disclosure.

Referring to FIG. 5, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot (Nslotsymb), a number slots per frame (Nframe,uslot), and a number of slots per subframe (Nsubframe,uslot) in accordance with an SCS configuration (u), in a case where a normal CP is used.

TABLE 1

| SCS ($15 * 2^u$) | $N_{symb}^{slot}$ | $N_{slot}^{frame,u}$ | $N_{slot}^{subframe,u}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe in accordance with the SCS, in a case where an extended CP is used.

TABLE 2

| SCS ($15 * 2^u$) | $N_{symb}^{slot}$ | $N_{slot}^{frame,u}$ | $N_{slot}^{subframe,u}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table A3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table A4, FR1 may include a band within a range of 410 MHz to 7125 MHz. More specifically, FR1 may include a frequency band of 6 GHz (or 5850, 5900, 5925 MHZ, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 6:
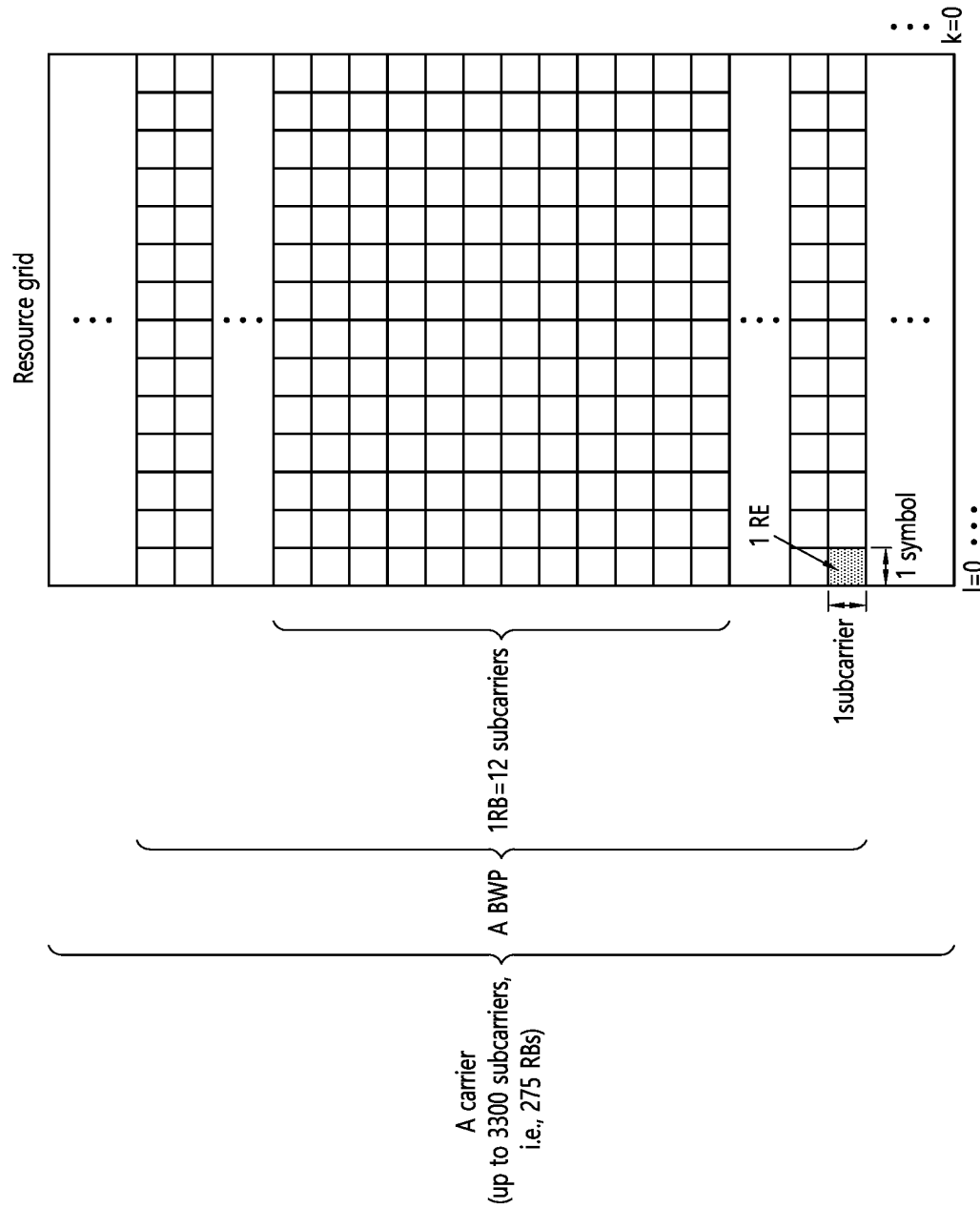
FIG. 6 shows a structure of a slot of an NR frame, in accordance with an embodiment of the present disclosure.

FIG. 6 shows a structure of a slot of an NR frame, in accordance with an embodiment of the present disclosure.

Referring to FIG. 6, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, PDSCH, or CSI-RS (excluding RRM) outside the active DL BWP. For example, the UE may not trigger a channel state information (CSI) report for the inactive DL BWP. For example, the UE may not transmit PUCCH or PUSCH outside an active UL BWP. For example, in a downlink case, the initial BWP may be given as a consecutive RB set for an RMSI CORESET (configured by PBCH). For example, in an uplink case, the initial BWP may be given by SIB for a random access procedure. For example, the default BWP may be configured by a higher layer. For example, an initial value of the default BWP may be an initial DL BWP. For energy saving, if the UE fails to detect DCI during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 7:
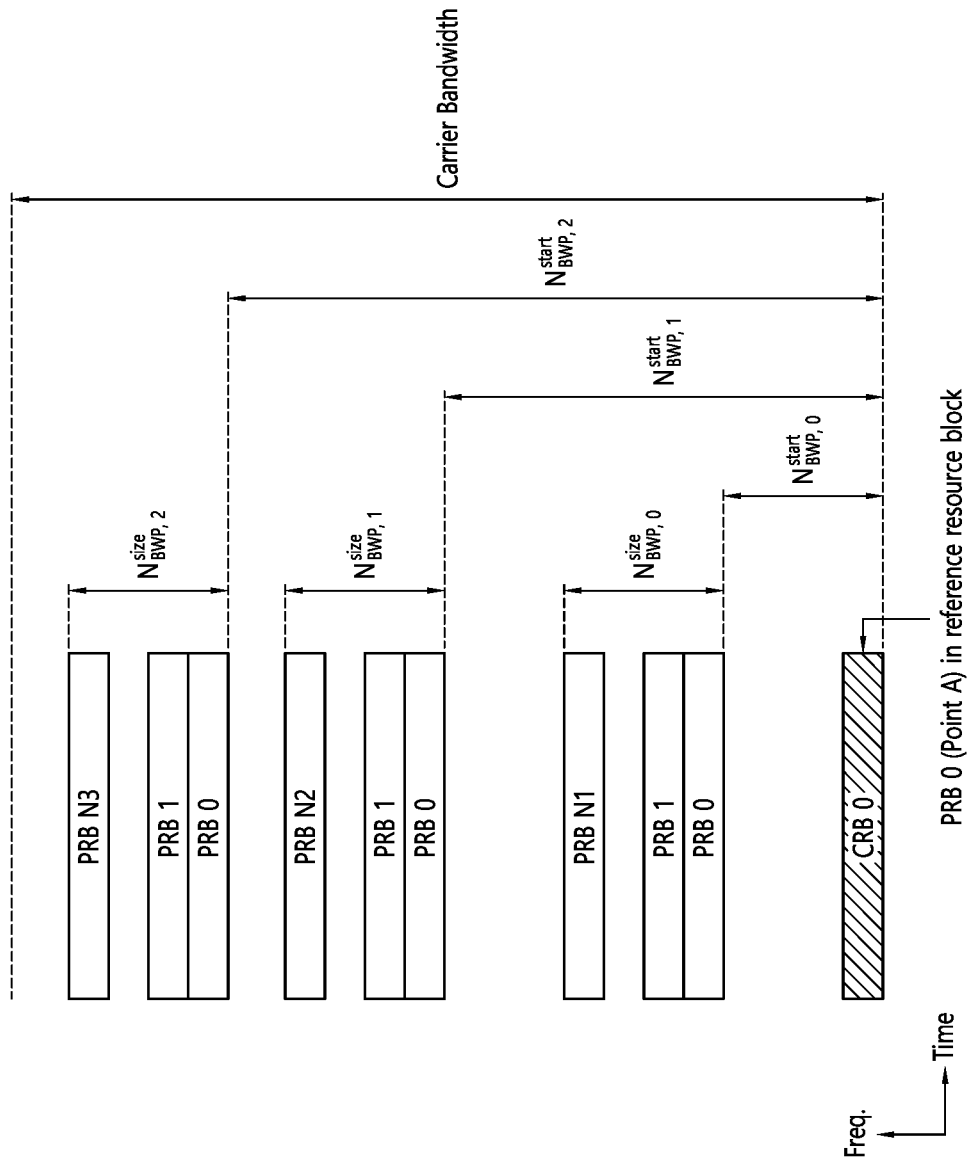
FIG. 7 shows an example of a BWP, in accordance with an embodiment of the present disclosure.

FIG. 7 shows an example of a BWP, in accordance with an embodiment of the present disclosure. The embodiment of FIG. 7 may be combined with various embodiments of the present disclosure. It is assumed in the embodiment of FIG. 7 that the number of BWPs is 3.

Referring to FIG. 7, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset NstartBWP from the point A, and a bandwidth NsizeBWP. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

FIG. 8 shows a radio protocol architecture for a SL communication, in accordance with an embodiment of the present disclosure. The embodiment of FIG. 8 may be combined with various embodiments of the present disclosure. More specifically, (a) of FIG. 8 shows a user plane protocol stack, and (b) of FIG. 8 shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 9:
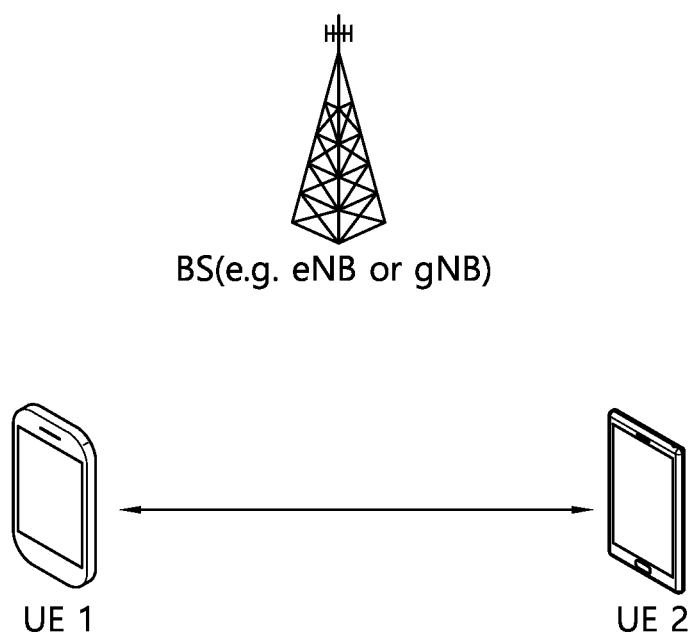
FIG. 9 shows a UE performing V2X or SL communication, in accordance with an embodiment of the present disclosure.

FIG. 9 shows a UE performing V2X or SL communication, in accordance with an embodiment of the present disclosure. The embodiment of FIG. 9 may be combined with various embodiments of the present disclosure.

Referring to FIG. 9, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 10:
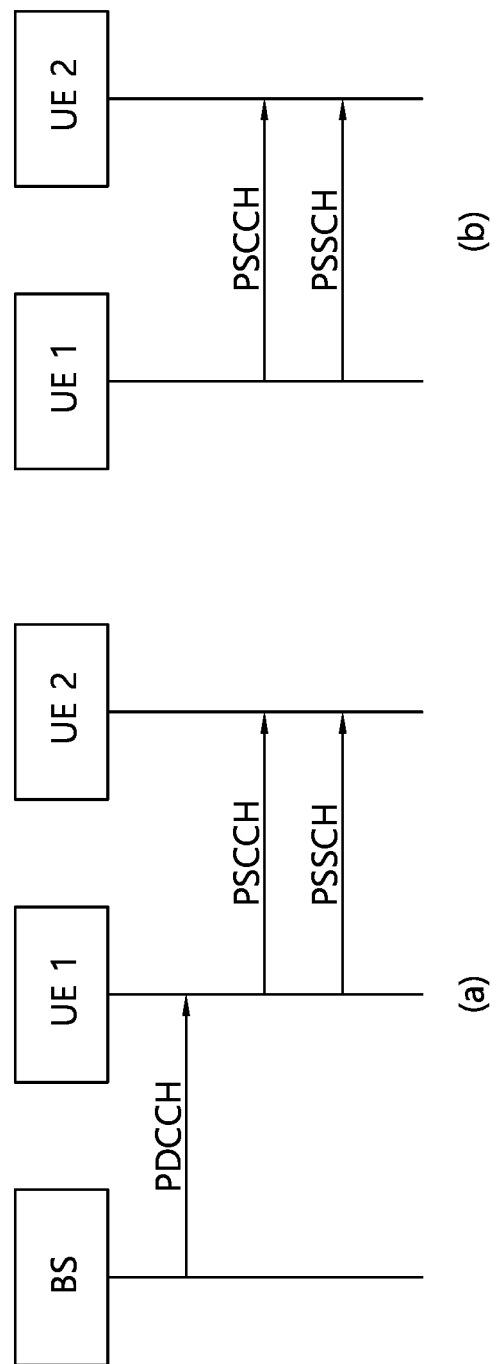
FIG. 10 shows a procedure of performing V2X or SL communication by a UE based on a transmission mode, in accordance with an embodiment of the present disclosure.

FIG. 10 shows a procedure of performing V2X or SL communication by a UE based on a transmission mode, in accordance with an embodiment of the present disclosure. The embodiment of FIG. 10 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, (a) of FIG. 10 shows a UE operation related to an LTE transmission mode 1 or an LTE transmission mode 3. Alternatively, for example, (a) of FIG. 10 shows a UE operation related to an NR resource allocation mode 1. For example, the LTE transmission mode 1 may be applied to general SL communication, and the LTE transmission mode 3 may be applied to V2X communication.

For example, (b) of FIG. 10 shows a UE operation related to an LTE transmission mode 2 or an LTE transmission mode 4. Alternatively, for example, (b) of FIG. 10 shows a UE operation related to an NR resource allocation mode 2.

Referring to (a) of FIG. 10, in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to (b) of FIG. 10, in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 11:
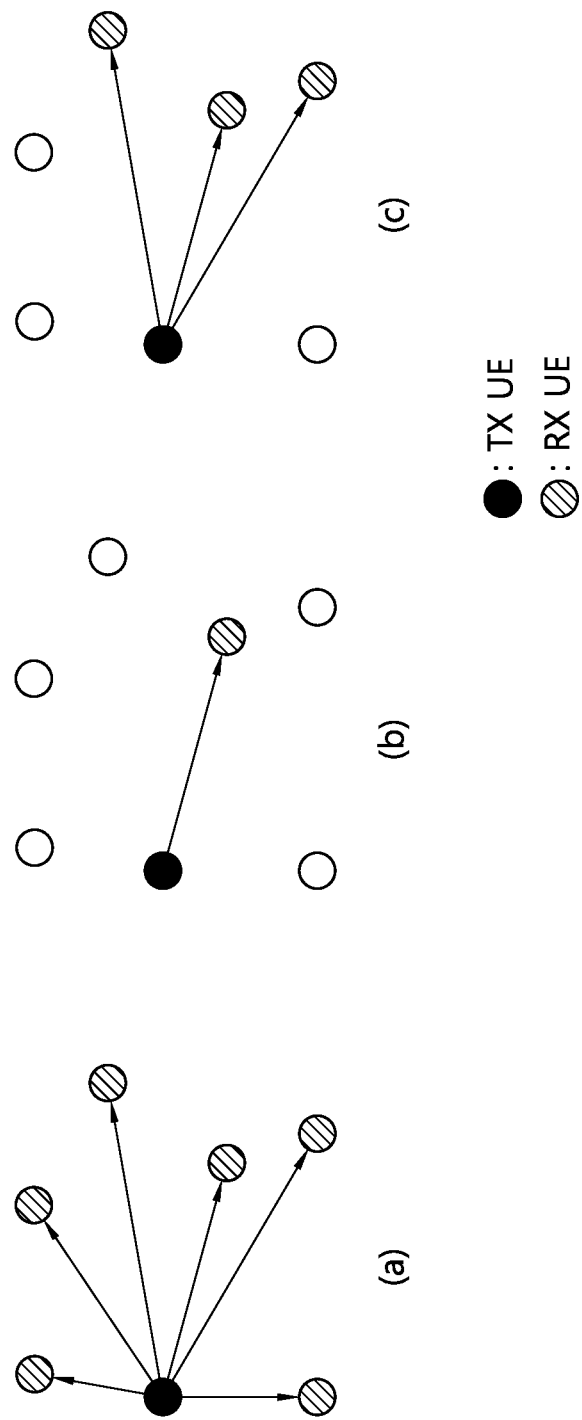
FIG. 11 shows three cast types, in accordance with an embodiment of the present disclosure.

FIG. 11 show three cast types, in accordance with an embodiment of the present disclosure. The embodiment of FIG. 11 may be combined with various embodiments of the present disclosure. Specifically, (a) of FIG. 11 shows broadcast-type SL communication, (b) of FIG. 11 shows unicast type-SL communication, and (c) of FIG. 11 shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Meanwhile, in sidelink communication, a UE may need to effectively select a resource for sidelink transmission. Hereinafter, a method in which a UE effectively selects a resource for sidelink transmission and an apparatus supporting the method will be described according to various embodiments of the present disclosure. In various embodiments of the present disclosure, the sidelink communication may include V2X communication.

At least one scheme proposed according to various embodiments of the present disclosure may be applied to at least any one of unicast communication, groupcast communication, and/or broadcast communication.

At least one method proposed according to various embodiment of the present embodiment may apply not only to sidelink communication or V2X communication based on a PC5 interface or an SL interface (e.g., PSCCH, PSSCH, PSBCH, PSSS/SSSS, etc.) or V2X communication but also to sidelink communication or V2X communication based on a Uu interface (e.g., PUSCH, PDSCH, PDCCH, PUCCH, etc.).

In various embodiments of the present disclosure, a receiving operation of a UE may include a decoding operation and/or receiving operation of a sidelink channel and/or sidelink signal (e.g., PSCCH, PSSCH, PSFCH, PSBCH, PSSS/SSSS, etc.). The receiving operation of the UE may include a decoding operation and/or receiving operation of a WAN DL channel and/or a WAN DL signal (e.g., PDCCH, PDSCH, PSS/SSS, etc.). The receiving operation of the UE may include a sensing operation and/or a CBR measurement operation. In various embodiments of the present disclosure, the sensing operation of the UE may include a PSSCH-RSRP measurement operation based on a PSSCH DM-RS sequence, a PSSCH-RSRP measurement operation based on a PSSCH DM-RS sequence scheduled by a PSCCH successfully decoded by the UE, a sidelink RSSU (S-RSSI) measurement operation, and an S-RSSI measurement operation based on a V2X resource pool related subchannel. In various embodiments of the disclosure, a transmitting operation of the UE may include a transmitting operation of a sidelink channel and/or a sidelink signal (e.g., PSCCH, PSSCH, PSFCH, PSBCH, PSSS/SSSS. etc.). The transmitting operation of the UE may include a transmitting operation of a WAN UL channel and/or a WAN UL signal (e.g., PUSCH, PUCCH, SRS, etc.). In various embodiments of the present disclosure, a synchronization signal may include SLSS and/or PSBCH.

In various embodiments of the present disclosure, a configuration may include signaling, signaling from a network, a configuration from the network, and/or a pre-configuration from the network. In various embodiments of the present disclosure, a definition may include signaling, signaling from a network, a configuration form the network, and/or a pre-configuration from the network. In various embodiment of the present disclosure, a designation may include signaling, signaling from a network, a configuration from the network, and/or a pre-configuration from the network.

In various embodiments of the present disclosure, a ProSe per packet priority (PPPP) may be replaced with a ProSe per packet reliability (PPPR), and the PPPR may be replaced with the PPPP. For example, it may mean that the smaller the PPPP value, the higher the priority, and that the greater the PPPP value, the lower the priority. For example, it may mean that the smaller the PPPR value, the higher the reliability, and that the greater the PPPR value, the lower the reliability. For example, a PPPP value related to a service, packet, or message related to a high priority may be smaller than a PPPP value related to a service, packet, or message related to a low priority. For example, a PPPR value related to a service, packet, or message related to a high reliability may be smaller than a PPPR value related to a service, packet, or message related to a low reliability In various embodiments of the present disclosure, a session may include at least any one of a unicast session (e.g., unicast session for sidelink), a groupcast/multicast session (e.g., groupcast/multicast session for sidelink), and/or a broadcast session (e.g., broadcast session for sidelink).

In various embodiments of the present disclosure, a carrier may be interpreted as at least any one of a BWP and/or a resource pool. For example, the carrier may include at least any one of the BWP and/or the resource pool. For example, the carrier may include one or more BWPs. For example, the BWP may include one or more resource pools.

Meanwhile, considering the coexistence between the sidelink (ie, the link between terminals) and the Uu link (ie, the link between the terminal and the base station), some resources (eg, downlink resources) need to be excluded from the sidelink resources. For this purpose, according to an embodiment, the terminal supporting the sidelink needs to be aware of the slot format configured through the Uu link. Table 5 shows an example of a slot format for a general cyclic prefix (CP). For example, specific characteristics of the slot format may be based on the disclosure of 3GPP TS 38.213 V15.4.0.

TABLE 5

| | Symbol number in a slot | | | | | | | | | | | | | |
|---|---|---|---|---|---|---|---|---|---|---|---|---|---|---|
| Format | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | D | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| ... | | | | | | ... | | | | | | | | |
| 50 | D | D | F | F | U | U | U | D | F | F | U | U | U | |
| 51 | D | F | F | U | U | U | U | D | F | F | U | U | U | |
| 52 | D | F | F | F | F | F | U | D | F | F | F | F | U | |
| 53 | D | D | F | F | F | F | U | D | F | F | F | F | U | |
| 54 | F | F | F | F | F | F | F | D | D | D | D | D | D | |
| 55 | D | D | F | F | F | U | U | U | D | D | D | D | D | |
| 56-254 | Reserved | | | | | | | | | | | | | |
| 255 | UE determines the slot format for the slot based on TDD-UL-DL-ConfigurationCommon, or TDD-UL-DL-ConfigDedicated and, if any, on detected DCI formats | | | | | | | | | | | | | |

Furthermore, in the Uu link according to an embodiment, the SFI (Slot Format Indicator) may be expressed as a maximum of two patterns, and each pattern has an independent DL/UL transmission period and an independent slot configuration (eg, DL, FL(Flexible), UL configuration, etc.). In this case, two contiguous patterns may exist more than once within 20 msec, but the boundary of each pattern may be preserved within the 20 msec. The slot format may be repeated in units of at least 20 msec, and may be repeated in units smaller than the 20 msec. However, when two patterns are configured, the slot configuration may be more complicated than when one pattern is configured.

Meanwhile, in the present disclosure, the "pattern" may be replaced with various terms such as a TDD UL/DL pattern, a TDD-UL-DL pattern, etc. Also, in the present disclosure, "DL/UL transmission period" may be replaced with various terms such as TDD-UL-DL transmission period, TDD DL/UL transmission period, transmission period, etc.

Figure 12:
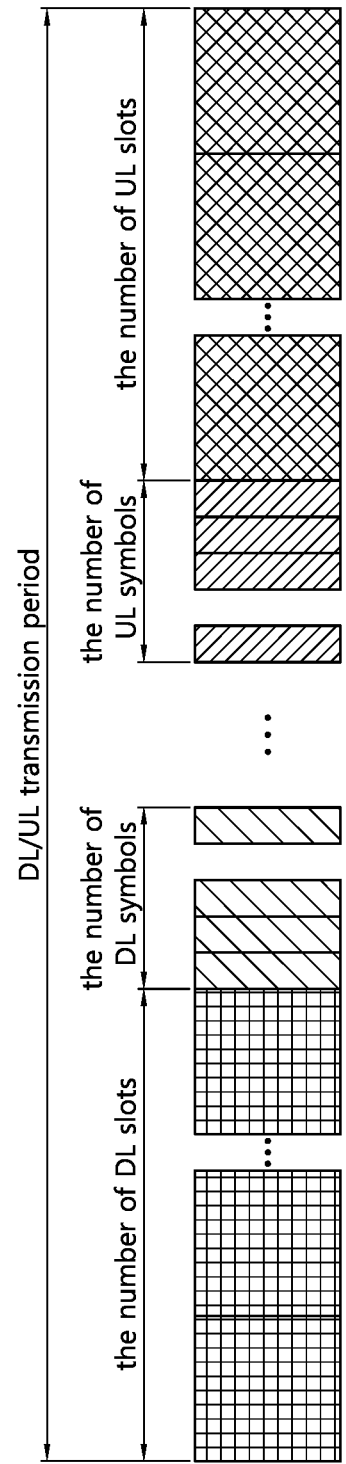
FIG. 12 is a diagram for illustrating a procedure of determining a resource in a TDD-UL-DL transmission period according to an embodiment of the present disclosure.

FIG. 12 is a diagram for illustrating a procedure of determining a resource in a TDD-UL-DL transmission period according to an embodiment of the present disclosure.

An in-coverage terminal may receive TDD-UL-DL configuration information from the base station. For example, the in-coverage terminal may receive TDD-UL-DL configuration information including subcarrier spacing and TDD-UL-DL pattern from the base station, where the TDD-UL-DL pattern may include at least one of TDD-UL-DL transmission period, information on the number of (continuous) DL slots, information on the number of (continuous) DL symbols, information on the number of (continuous) UL slots, or information on the number of (continuous) UL symbols. The resources within the TDD-UL-DL transmission period determined by the in-coverage terminal based on the TDD-UL-DL configuration information may be, for example, as shown in FIG. 12.

Referring to FIG. 12, the resource configuration within the DL/UL transmission period (or the TDD-UL-DL transmission period) is determined based on information on the number of DL slots included in the TDD-UL-DL configuration information, information on the number of DL symbols, information on the number of UL symbols, and information on the number of UL slots.

Meanwhile, in the case of an out-of-coverage terminal, a method of receiving slot format information (or TDD-UL-DL configuration information) from another terminal may be considered. For example, the second terminal in the out-of-coverage state may receive information about the slot format (or TDD-UL-DL configuration information) from the first terminal through the PSBCH. However, considering all possible slot formats (or TDD-UL-DL configuration) in NR, in the process in which the first terminal informs the second terminal of information about the slot format (or TDD-UL-DL configuration information), excessive signaling overhead may occur. In particular, when two slot patterns (or TDD-UL-DL patterns) are configured, signaling overhead may be further increased. Therefore, in order to solve the above problem, a method of effectively notifying the slot format (or TDD-UL-DL configuration) needs to be proposed.

Hereinafter, a method for generating, compressing, and/or transmitting TDD-UL-DL configuration information and an apparatus supporting the same will be described with reference to FIGS. 13 and 14, according to an embodiment of the present disclosure. In the present disclosure, TDD-UL-DL configuration information may be referred to by various terms such as information on slot format, information on slot format for sidelink, sidelink slot format information, restricted slot format indicator, restricted SFI, or DL/UL configuration information, etc.

Figure 13:
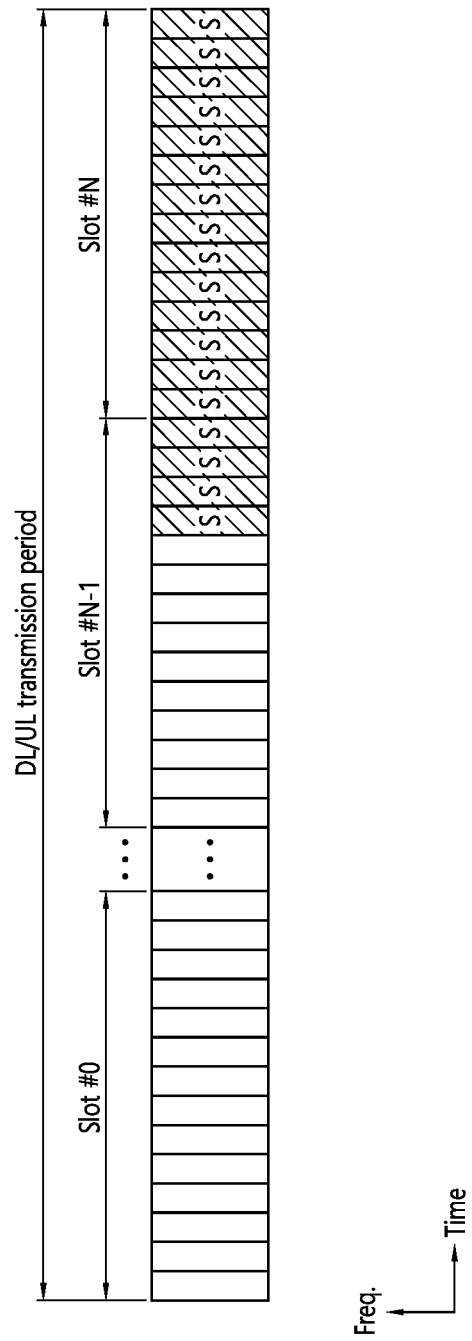
FIG. 13 is a diagram for illustrating a procedure of determining an SL resource in a TDD-UL-DL transmission period according to an embodiment of the present disclosure.

FIG. 13 is a diagram for illustrating a procedure of determining an SL resource in a TDD-UL-DL transmission period according to an embodiment of the present disclosure.

According to an embodiment of the present disclosure, the TDD-UL-DL configuration information may include the number of (information on) SL slots and/or the number of (information on) SL symbols. Based on the TDD-UL-DL configuration information, the UE may configure as many SL slots as the number of SL slots from the last slot in the corresponding TDD-UL-DL transmission period. Thereafter, the terminal may configure as many SL symbols as the number of SL symbols from the last symbol of a slot immediately preceding the first SL slot among the configured SL slots.

In one example, the TDD-UL-DL transmission period may be N msec. For example, the TDD-UL-DL transmission period may be 20 msec. For example, the TDD-UL-DL transmission period may be a value predefined for the terminal. For example, the TDD-UL-DL transmission period may be a preconfigured value for the terminal.

Referring to FIG. 13, the example in which the number of SL slots is configured to 1 and the number of SL symbols is configured to 4. For example, the TDD-UL-DL transmission period is a value pre-defined for the terminal. For example, the TDD-UL-DL transmission period is a value pre-configured for the terminal.

That is, in one embodiment, an SL resource in the TDD-UL-DL transmission period may include (N−K+1)th slot through Nth slot and (M−L+1)th symbol through Mth symbol of (N−K)th slot in the TDD-UL-DL transmission period, wherein the N may represent a total number of slots included in the TDD-UL-DL transmission period, the K may represent the slot number of the first SL resource, the M may represent a total number of symbols in a slot, and the L may represent the symbol number of the first SL resource.

Figure 14:
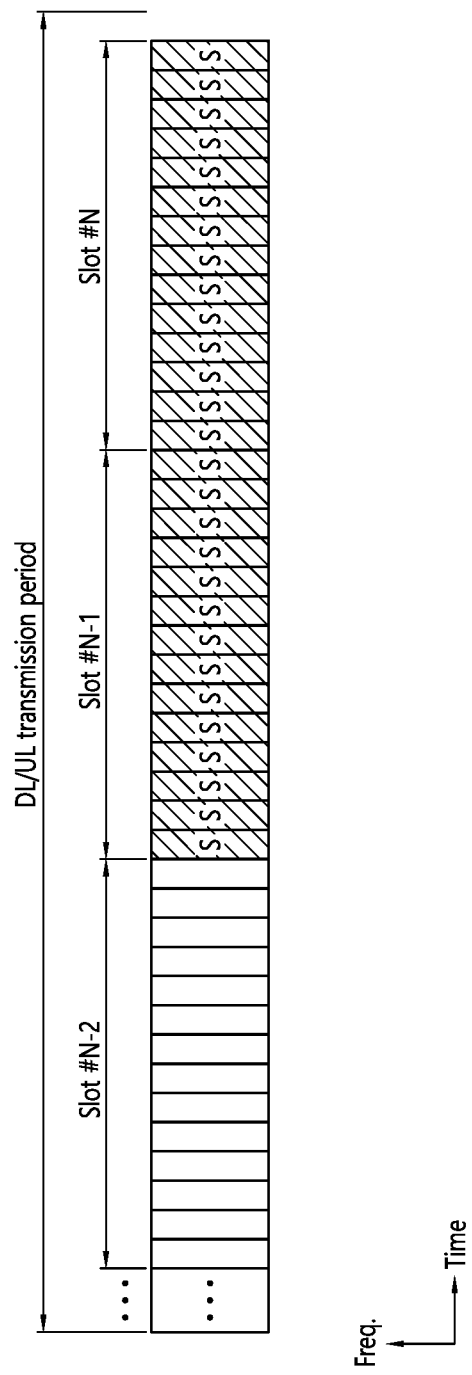
FIG. 14 is a diagram for illustrating a procedure of determining an SL resource in a TDD-UL-DL transmission period according to another embodiment of the present disclosure.

FIG. 14 is a diagram for illustrating a procedure of determining an SL resource in a TDD-UL-DL transmission period according to another embodiment of the present disclosure.

FIG. 14 illustrates an example of a resource configuration within a TDD-UL-DL transmission period according to an embodiment of the present disclosure when information on the number of SL slots included in TDD-UL-DL configuration information indicates 2.

In order to reduce signaling overhead, the TDD-UL-DL configuration information according to an embodiment may include information on the number of SL slots without including information on the number of SL symbols. Accordingly, referring to FIG. 14, the terminal may configure two SL slots from the last slot (ie, slot #N) within the corresponding TDD-UL-DL transmission period (or DL/UL transmission period). And, the terminal may not configure an additional SL symbol.

According to an embodiment of the present disclosure, TDD-UL-DL configuration information (eg, TDD-UL-DL configuration common information) may be defined as shown in Table 6. Alternatively, the TDD-UL-DL configuration information may be defined as shown in Table 7.

TABLE 6

```
TDD-UL-DL-ConfigCommon ::=            SEQUENCE {
    referenceSubcarrierSpacing            SubcarrierSpacing,
    pattern1                              TDD-UL-DL-Pattern,
    pattern2                              TDD-UL-DL-Pattern
OPTIONAL, -- Need R
    ...
}
TDD-UL-DL-Pattern ::=                 SEQUENCE {
    dl-UL-TransmissionPeriodicity         ENUMERATED {ms0p5, ms0p625, ms1,
ms1p25, ms2, ms2p5, ms5, ms10},
    nrofDownlinkSlots                         INTEGER (0..maxNrofSlots),
    nrofDownlinkSymbols                       INTEGER (0..maxNrofSymbols-1),
    nrofUplinkSlots                           INTEGER (0..maxNrofSlots),
    nrofUplinkSymbols                         INTEGER (0..maxNrofSymbols-1),
    nrofSidelinkSlots                         INTEGER (0..maxNrofSlots),
    nrofSidelinkSymbols                       INTEGER (0..maxNrofSymbols-1),
    ...,
    [[
    dl-UL-TransmissionPeriodicity-v1530   ENUMERATED {ms3, ms4}
OPTIONAL -- Need R
    ]]
}
```

According to Table 6, the TDD UL-DL pattern information (TDD-UL-DL-Pattern in Table 6) may include information on the number of SL slots (nrofSidelinkSlots) and information on the number of SL symbols (nrofSidelinkSymbols), and the terminal may determine the SL resource based on at least one of information on the number of SL slots and information on the number of SL symbols. In an embodiment, information on the number of SL slots, information on the number of SL symbols, and the like may be referred to as information on SL resources.

According to an embodiment of the present disclosure, the terminal may configure the SL resource based on the numerology of a given carrier. Alternatively, the terminal may configure the SL resource based on the numerology of the PSBCH received from another terminal.

According to an embodiment of the present disclosure, the UE may configure the last one or two symbols of all slots as UL resources for the Uu link. In this case, the last one or two symbols of all slots may be excluded from the SL resource.

TABLE 7

```
TDD-UL-DL-ConfigCommon ::=            SEQUENCE {
    referenceSubcarrierSpacing            SubcarrierSpacing,
    pattern1                              TDD-UL-DL-Pattern,
    pattern2                              TDD-UL-DL-Pattern
OPTIONAL, -- Need R
    ...
}
TDD-UL-DL-Pattern ::=                 SEQUENCE {
    dl-UL-TransmissionPeriodicity         ENUMERATED {ms0p5, ms0p625, ms1,
ms1p25, ms2, ms2p5, ms5, ms10},
    nrofDownlinkSlots                         INTEGER (0..maxNrofSlots),
    nrofDownlinkSymbols                       INTEGER (0..maxNrofSymbols-1),
    nrofUplinkSlots                           INTEGER (0..maxNrofSlots),
    nrofUplinkSymbols                         INTEGER (0..maxNrofSymbols-1),
    nrofSidelinkSlots                         INTEGER (0..maxNrofSlots),
    ...,
    [[
    dl-UL-TransmissionPeriodicity-v1530   ENUMERATED {ms3, ms4}
OPTIONAL -- Need R
    ]]
}
```

According to Table 7, the TDD UL/DL pattern may include only information on the number of sidelink slots (nrofSidelinkSlots). That is, the TDD UL/DL pattern may not include information on the number of sidelink symbols (nrofSidelinkSymbols).

In addition, according to an embodiment of the present disclosure, at least one of the information on the number of SL slots and the information on the number of SL symbols may be derived from at least one of information on the number of UL slots and information on the number of UL symbols. In this case, separate signaling for limiting and/or indicating that the UL resource is an SL resource may be required.

Figure 15:
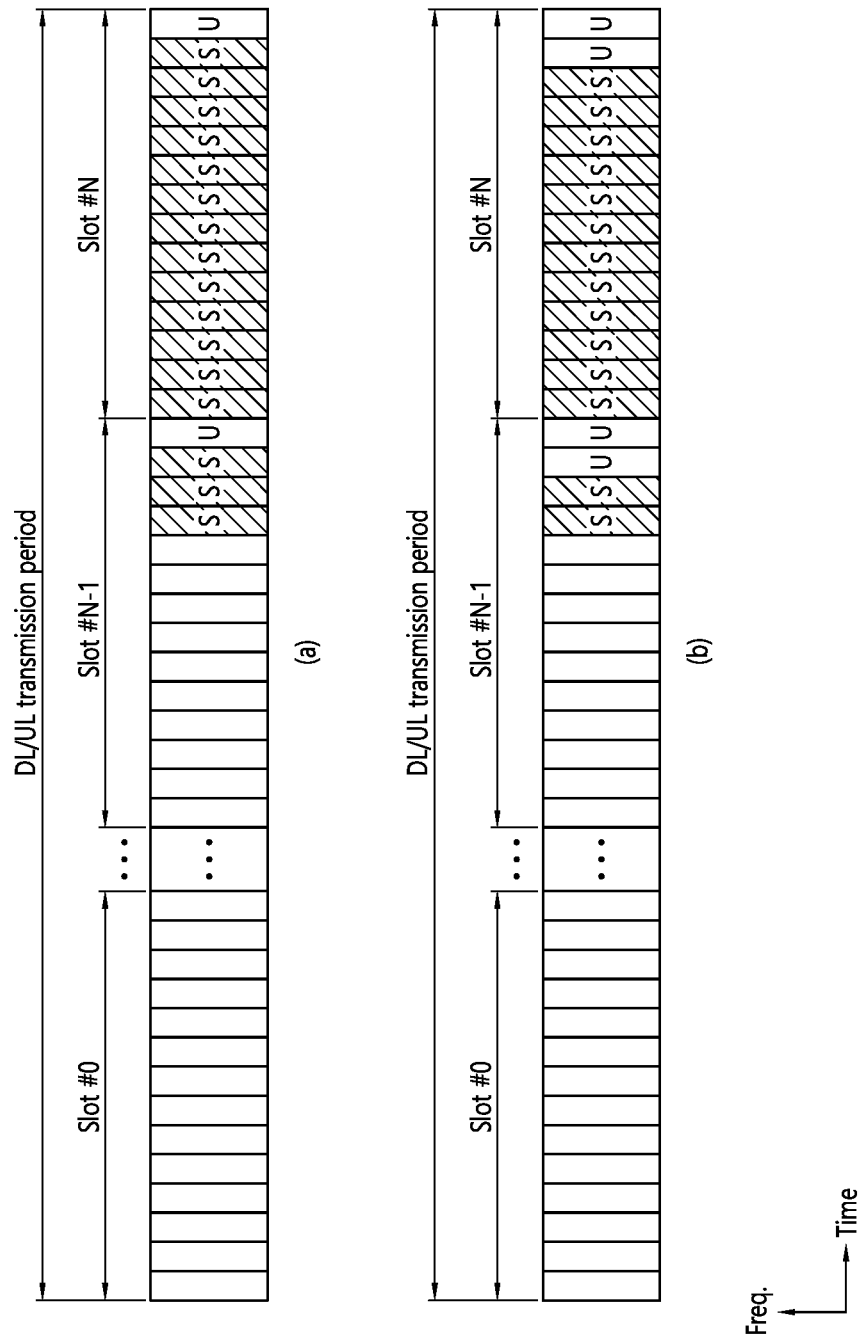
FIG. 15 is a diagram for illustrating a procedure of determining an SL resource and a part of an UL resource in a TDD-UL-DL transmission period according to an embodiment.

FIG. 15 is a diagram for illustrating a procedure of determining an SL resource and a part of an UL resource in a TDD-UL-DL transmission period according to an embodiment. Referring to FIG. 15, an example in which the last one or two symbols of all slots is configured as a UL resource for a Uu link is shown. Specifically, FIG. 15 (a) shows an example in which the last one symbol of all slots is configured as a UL resource for the Uu link, and FIG. 15 (b) shows an example in which the last two symbols of all slots are configured as a UL resource for the Uu link.

Referring to (a) of FIG. 15, the SL resource in the TDD-UL-DL transmission period according to an embodiment may include (N−K+1)th slot through Nth slot except for Mth symbol and (M−L+1)th symbol through (M−1)th symbol of (N−K)th slot in the TDD-UL-DL transmission period. In the TDD-UL-DL transmission period, the Mth symbol of the (N−K+1)th slot through the Nth slot may be determined to an UL resource. In this case, the N may represent a total number of slots included in the TDD-UL-DL transmission period, the K may represent a slot number of the first SL resource, the M may represent a total number of symbols in a slot, and the L may represent a symbol numbers of the first SL resource.

Referring to (b) of FIG. 15, the SL resource in the TDD-UL-DL transmission period according to an embodiment may include (N−K+1)th slot through Nth slot except for (M−1)th symbol and Mth symbol, and (M−L+1)th symbol through (M−2)th symbol of (N−K)th slot. In the TDD-UL-DL transmission period, the (M−1)th symbol and the Mth symbol of the (N−K+1)th slot through the Nth slot may be determined to an UL resource. In this case, the N may represent a total number of slots included in the TDD-UL-DL transmission period, the K may represent a slot number of the first SL resource, the M may represent a total number of symbols in a slot, and the L may represent a symbol number of the first SL resource.

Meanwhile, according to an embodiment of the present disclosure, an SL resource may be additionally configured within a TDD-UL-DL transmission period (eg, 20 msec) in consideration of two TDD-UL-DL patterns. A slot offset may be configured based on the start of the TDD-UL-DL transmission period, the middle of the TDD-UL-DL transmission period, or the end of the TDD-UL-DL transmission period. Alternatively, predefined candidate offsets may exist within the TDD-UL-DL transmission period, and any one of the predefined candidate offsets may be indicated. When the number of SL slots and/or the number of SL symbols is configured, the terminal may additionally configure SL resources based on the set number of slots and/or the number of SL symbols based on the slot offset and the reference point.

Figure 16:
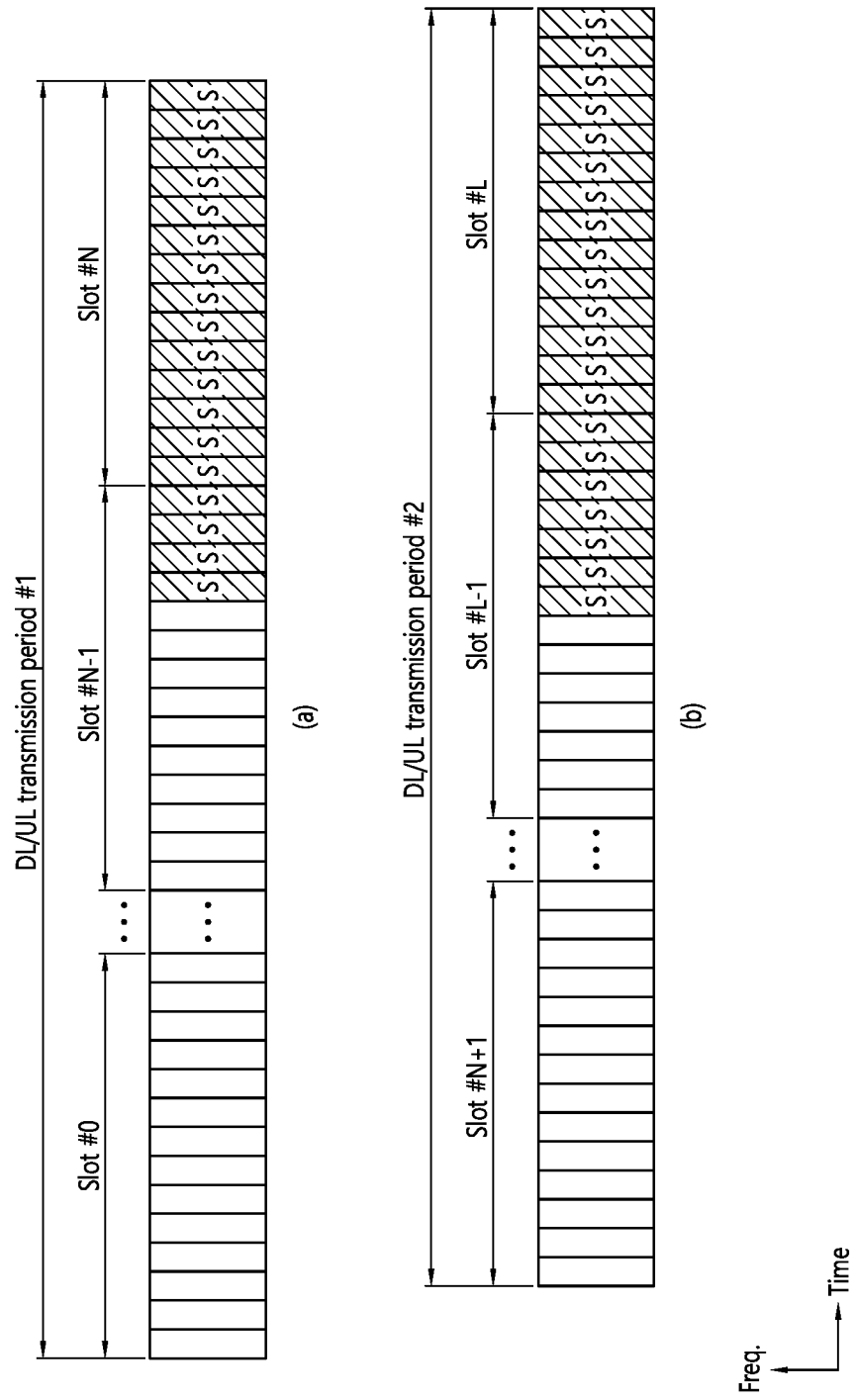
FIG. 16 is a diagram for illustrating a procedure of additionally determining an SL resource in a TDD-UL-DL transmission period according to an embodiment of the present disclosure.

FIG. 16 is a diagram for illustrating a procedure of additionally determining an SL resource in a TDD-UL-DL transmission period according to an embodiment of the present disclosure.

According to an embodiment of the present disclosure, the TDD-UL-DL configuration may be expressed by N bits. For example, the TDD-UL-DL configuration may include a combination of LTE TDD-UL-DL configuration, DL-only configuration, UL-only configuration, or SL-only configuration.

In one example, each element of the N bits may be an independent field. For example, the number of slots of the first SL resource may be represented by N1 bits, the number of first SL symbols may be represented by N2 bits, the number of second SL slots may be represented by N3 bits, and the number of second SL symbols may be represented by N4 bits.

In another example, the N bits may be bits related to the number of SL slots, the number of SL symbols, and/or the slot offset. For example, when N is 3, the number of SL slots/symbols, etc, may be related to each other as shown in Table 8 below.

TABLE 8

| N | a slot number of a first SL resource | a symbol number of a first SL resource | a slot number of a second SL resource | a symbol number of a second SL resource | a slot offset of a second SL resource |
|---|---|---|---|---|---|
| 000 | 1 | 4 | — | — | — |
| 001 | 1 | 8 | — | — | — |
| 010 | 2 | 4 | — | — | — |
| 011 | 2 | 8 | — | — | — |
| 100 | 1 | 4 | 1 | 4 | 1 |
| 101 | 1 | 8 | 1 | 8 | 2 |
| 110 | 2 | 4 | 1 | 4 | 1 |
| 111 | 2 | 8 | 1 | 8 | 2 |

Referring to Table 8, when N is 3, a relationship between the number of slots of the first SL resource and the slot offset of the second SL resource may be predefined. The slot offset of the second SL resource may be an offset configured based on the start of the TDD-UL-DL transmission period, the middle of the TDD-UL-DL transmission period, or the end of the TDD-UL-DL transmission period.

That is, according to an example, based on the N-bit binary value and pre-configuration by the base station, at least one of information on the number of slots of the first SL resource, the symbol of the first SL resource At least one of information on the number, information on the number of slots of the second SL resource, information on the number of symbols of the second SL resource, and the offset information may be determined.

However, in the example based on Table 8, for the Uu link, the slot format may be limited according to the TDD-UL-DL configuration.

In an embodiment, the TDD-UL-DL configuration information may include TDD-UL-DL pattern indication information for indicating a TDD-UL-DL pattern and information on a TDD-UL-DL transmission period. TDD-UL-DL pattern information (or information on SL resources obtained based on TDD-UL-DL configuration information) may include information on the number of slots of SL resources within the TDD-UL-DL transmission period. The TDD-UL-DL pattern indication information may be represented by a binary value of X bits, the information on the TDD-UL-DL transmission period may be represented by a binary value of Y bits, and the TDD-UL—The information on the number of slots of the SL resource in the DL transmission period may be expressed as a binary value of Z bits, where X, Y, and Z may be positive integers. This embodiment may be described, for example, based on Table 9 below.

TABLE 9

Proposal 2: The TDD configuration indication is done as follows:
X bits to indicate patterns + Y bits to indicate periodicity + Z bits to indicate UL slots.
FFS the values of X, Y and Z.
Total Z bits to indicate UL slots in pattern 1 and pattern 2 respectively if two patterns are configured.

In an example according to Table 9, the TDD-DL-UL pattern indication information (represented by X bits) may represent at least one of the number of TDD-UL-DL patterns present in the TDD-UL-DL transmission period (represented by Y bits) or the types of TDD-UL-DL patterns. If there are two TDD-UL-DL patterns in the TDD-UL-DL transmission period, a sum of Z1 bits for indicating the number of slots of the first SL resource for the first TDD-UL-DL pattern and Z2 bits for indicating the number of slots of the second SL resource for the second TDD-UL-DL pattern may be Z bits.

In another example according to Table 9, information on the number of slots of the SL resource in the TDD-UL-DL transmission period is not directly indicated, and may be indirectly indicated based on information on the number of the slot of the UL resource in the TDD-UL-DL transmission period. For example, if there are two TDD-UL-DL patterns in the TDD-UL-DL transmission period, ZA bits for indicating the number of slots of the first UL resource for the first TDD-UL-DL pattern and ZB bits for indicating the number of slots of the second UL resource for the second TDD-UL-DL pattern may be exist. In this case, the number of slots of the first SL resource in the TDD-UL-DL transmission period may be obtained based on the number of slots of the first UL resource, and the number of slots of the second SL resource in the TDD-UL-DL transmission period may be obtained based on the number of slots of the second UL resource. A sum of the ZA bits and the ZB bits may be Z bits.

In the other example according to Table 9, the base station according to an embodiment may determine the number of slots of the first SL resource based on the number of slots of the first UL resource within the TDD-UL-DL transmission period, and, the number of slots of the second SL resource may be determined based on the number of slots of the second UL resource. The base station may transmit TDD-UL-DL configuration information including information on the number of slots of the first SL resource and information on the number of slots of the second SL resource to the terminal (eg, the first apparatus).

In the other example according to Table 9, the first apparatus according to an embodiment may determine the slot number of the first SL resource and the slot number of the second SL resource based on the information on the slot number of the first UL resource and the information on the slot number of the second UL resource included in the TDD-UL-DL configuration information received from the base station.

Meanwhile, slot information and/or symbol information that the terminal may use for actual sidelink transmission/reception may be determined based on various combinations of at least one of a sidelink slot candidate set, a sidelink symbol candidate set, and/or a resource pool configuration.

For example, the transmitting terminal may transmit or indicate the sidelink slot and/or the symbol candidate set to the receiving terminal through the PSBCH. And/or, for example, the sidelink slot and/or symbol candidate set may be configured for a transmitting terminal and/or a receiving terminal, or may be configured in advance. And/or, for example, the transmitting terminal may transmit or indicate the sidelink slot and/or the symbol candidate set to the receiving terminal through PC5-RRC signaling. And/or, for example, the transmitting terminal may transmit or indicate the sidelink slot and/or the symbol candidate set to the receiving terminal through sidelink L1-signaling. And/or, for example, the transmitting terminal may transmit or indicate the sidelink slot and/or the symbol candidate set to the receiving terminal through the PSCCH. And/or, for example, the transmitting terminal may transmit or indicate the sidelink slot and/or the symbol candidate set to the receiving terminal through the PSSCH. And/or, for example, the transmitting terminal may transmit or indicate the sidelink slot and/or the symbol candidate set to the receiving terminal through 1st SCI.

And/or, for example, the transmitting terminal may transmit or indicate the sidelink slot and/or the symbol candidate set to the receiving terminal through 2nd SCI. And/or, for example, the transmitting terminal may transmit or indicate the sidelink slot and/or the symbol candidate set to the receiving terminal through SFCI. For example, the resource pool configuration may include a slot and/or a symbol set for sidelink transmission/reception.

Meanwhile, a sidelink slot and/or a symbol candidate set may be defined for a physical slot/symbol regardless of a resource pool. For example, a time axis resource in the resource pool configuration may be defined for a physical slot/symbol.

For example, the sidelink resource for actual sidelink transmission and reception may be limited when both the sidelink slot and/or the symbol candidate set and the time axis resources in the resource pool configuration are configured for sidelink purposes. For example, the terminal may perform sidelink transmission/reception by using sidelink resources in which both the sidelink slot and/or symbol candidate set and the time axis resources in the resource pool configuration are configured for sidelink purposes.

For example, the terminal may periodically configure the PSFCH resource based on the slot/symbol indicated in the resource pool, may configure the timing of the SL HARQ in the PSCCH/PSSCH, and may determine or configure a criterion of logical slot(s) such as the position/size of the sensing window during the sensing operation, a location/size of a window for resource selection. In this case, the sidelink slot and/or the symbol candidate set may be used to prevent PSCCH transmission of the terminal, PSSCH transmission of the terminal, PSFCH transmission of the terminal, and/or S-SSB transmission of the terminal. For example, in terms of network resources, the sidelink slot and/or the symbol candidate set may be used to secure resources for UL transmission of the terminal or may be used for congestion control of the terminal.

For example, the terminal may periodically configure the PSFCH resource based on the slot and/or symbol in which the sidelink slot and/or symbol candidate set and the time axis resource in the resource pool configuration may be all configured for the sidelink purpose, and may configure the timing of SL HARQ in the PSCCH/PSSCH, and may determine or configure criteria for logical slot(s) such as the position/size of the sensing window and the position/size of the window for resource selection during sensing operation. In the above case, when the sidelink slot and/or the symbol candidate set is transmitted on the PSBCH, the operations of the terminal according to the definition of the logical slot may be applied/performed differently between PSBCH periods or PSBCH transmissions.

For example, when the terminal transmits a sidelink slot and/or a symbol candidate set through the PSBCH, the amount of resources used for actual sidelink transmission/reception between PSBCH transmissions or between PSBCH periods may be changed. Meanwhile, the terminal may maintain resource pool configuration, resource allocation corresponding thereto, SL HARQ timing, and the like. For example, the terminal may maintain the resource pool configuration and corresponding resource allocation, SL HARQ timing, etc, configured through the base station or the like. For example, the terminal may maintain the resource pool configuration previously configured through the base station, etc., resource allocation corresponding thereto, SL HARQ timing, and the like. The main operation and configuration may prevent the system from malfunctioning even when the terminal fails to detect a sidelink slot and/or a symbol candidate set.

Meanwhile, in order to change the sidelink slot and/or symbol candidate set, the transmitting terminal may transmit the sidelink slot and/or the symbol candidate set to the receiving terminal through the PSCCH, PSSCH, and/or PSFCH. In this case, it is necessary to define a timeline for determining a sidelink resource that can actually be transmitted/received from among the sidelink slots and/or symbol candidate sets received by the receiving terminal. More specifically, the receiving terminal may need time to process the channel/signaling including the sidelink slot and/or the symbol candidate set. Accordingly, the time when the receiving terminal changes or applies the sidelink slot and/or the symbol candidate set may be different from the time when the receiving terminal receives the sidelink slot and/or the symbol candidate set.

For example, the timing at which the receiving terminal changes or applies the sidelink slot and/or the symbol candidate set may be configured or determined as a slot next to the slot in which the receiving terminal receives the sidelink slot and/or the symbol candidate set. For example, the time point at which the receiving terminal changes or applies the sidelink slot and/or the symbol candidate set may be configured or determined as a slot after the receiving terminal receives the sidelink slot and/or the symbol candidate set. For example, when the receiving terminal receives the sidelink slot and/or the symbol candidate set in the N-th slot, the receiving terminal may change or apply the sidelink slot and/or the symbol candidate set in the N+K-th slot. For example, N may be a positive integer, and K may be a positive integer. Or, for example, the time interval between the slot in which the receiving terminal receives the sidelink slot and/or the symbol candidate set and the starting slot in which the receiving terminal changes or applies the sidelink slot and/or the symbol candidate set may be configured equal to the time interval between the PSSCH and the SL HARQ feedback related to the PSSCH.

Meanwhile, the transmitting terminal may determine a payload for a sidelink slot and/or a symbol candidate set. For example, the transmitting terminal may be a terminal transmitting a PSBCH or a channel corresponding thereto. For example, the base station may transmit to the transmitting terminal or indicate at least one of TDD-UL-DL configuration common information, TDD-UL-DL configuration dedicated information, and/or dynamic SFI information. For example, the transmitting terminal may configure or determine all or part of a UL slot, an SL slot, and/or a symbol set indicated in the TDD-UL-DL configuration common information as a sidelink slot and/or a symbol candidate set. For example, the transmitting terminal may configure or determine all or part of the UL slot, SL slot, and/or symbol set indicated in the TDD-UL-DL configuration common information and TDD-UL-DL configuration dedicated information as a sidelink slot and/or symbol candidate set. For example, the transmitting terminal may configure or determine all or part of the UL slot, SL slot and/or symbol set indicated in TDD-UL-DL configuration common information, TDD-UL-DL configuration dedicated information, and dynamic SFI to a sidelink slot and/or a symbol candidate set.

For example, the base station may transmit or instruct at least one of TDD-UL-DL configuration common information, TDD-UL-DL configuration dedicated information, and/or dynamic SFI to the transmitting terminal. For example, the base station may configure or determine all or part of the UL slot, SL slot, and/or symbol set indicated in the TDD-UL-DL configuration common information as a sidelink slot and/or symbol candidate set, and may transmit it to the transmitting terminal. For example, the base station may configure or determine all or part of the UL slot, SL slot, and/or symbol set indicated in the TDD-UL-DL configuration common information and TDD-UL-DL configuration dedicated information as a sidelink slot and/or a symbol candidate set, and transmit it to the transmitting terminal. For example, the base station may configure or determine all or part of the UL slot, SL slot and/or symbol set indicated in TDD-UL-DL configuration common information, TDD-UL-DL configuration dedicated information and dynamic SFI as a sidelink slot and/or a symbol candidate set, and may transmit it to the transmitting terminal.

In the above, information on SL resources for SL communication has been described in detail according to an embodiment of the present disclosure. Hereinafter, a method of transmitting information on an SL resource to another terminal according to an embodiment of the present disclosure will be described.

Figure 17:
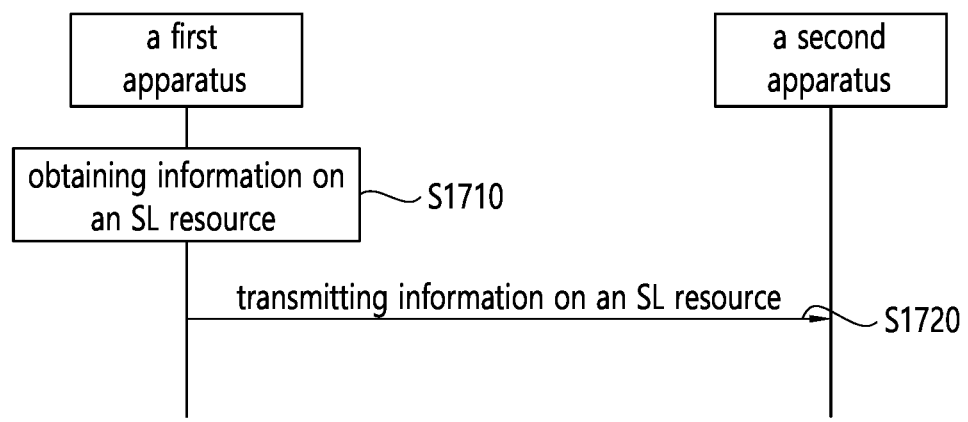
FIG. 17 is a flowchart illustrating a process in which a first apparatus and a second apparatus transmit/receive information on SL resources according to an embodiment of the present disclosure.

FIG. 17 is a flowchart illustrating a process in which a first apparatus and a second apparatus transmit/receive information on SL resources according to an embodiment of the present disclosure.

Referring to FIG. 17, in step S1710, the first apparatus may obtain information on an SL resource. In one example, the information on the SL resource may be preconfigured for the first apparatus by the base station. In another example, the information on the SL resource may be determined by the first apparatus. In another example, the SL resource indicated by the information on the SL resource may be determined, from among the UL resources indicated by the information on the UL (Uplink) resource included in the TDD-UL-DL configuration information received from the base station, by the base station. In another example, the first apparatus may determine an SL resource from among UL resources indicated by information on an uplink (UL) resource included in the TDD-UL-DL configuration information.

The information on the SL resource may include information on the number of slots in the SL resource, information on the number of symbols in the SL resource, and the like. Since the method of determining the SL resource based on the information on the SL resource has been described above, a detailed description thereof will be omitted.

In step S1720, the first apparatus may transmit information on the SL resource to the second apparatus.

In one example, the information on the SL resource may be transmitted to the second apparatus through the PSSCH.

Alternatively, in another example, in consideration of signaling overhead, information on the SL resource may be transmitted to the second apparatus in stages (via different channels). For example, the first apparatus may transmit information on the SL resource for pattern 2 (that is, configured based on the end of the period) to the second apparatus through the PSBCH, and the first apparatus may transmit information about the remaining (to cover information on the pattern 1) information on SL resources to the second apparatus through PSCCH and/or PSSCH later. Or, for example, the first apparatus may transmit information on the SL resource for pattern 2 (that is, configured based on the end of the period) to the second apparatus through the PSBCH, and the second apparatus may update information on the remaining SL resource (to cover information on the pattern 1) later through negotiation with the first apparatus. In some cases, TDD-UL-DL configuration information transmitted and received in the Uu link may be used.

Hereinafter, in FIG. 18, an operation when the terminal receives or does not receive information on SL resources according to an embodiment of the present disclosure will be described in detail.

Figure 18:
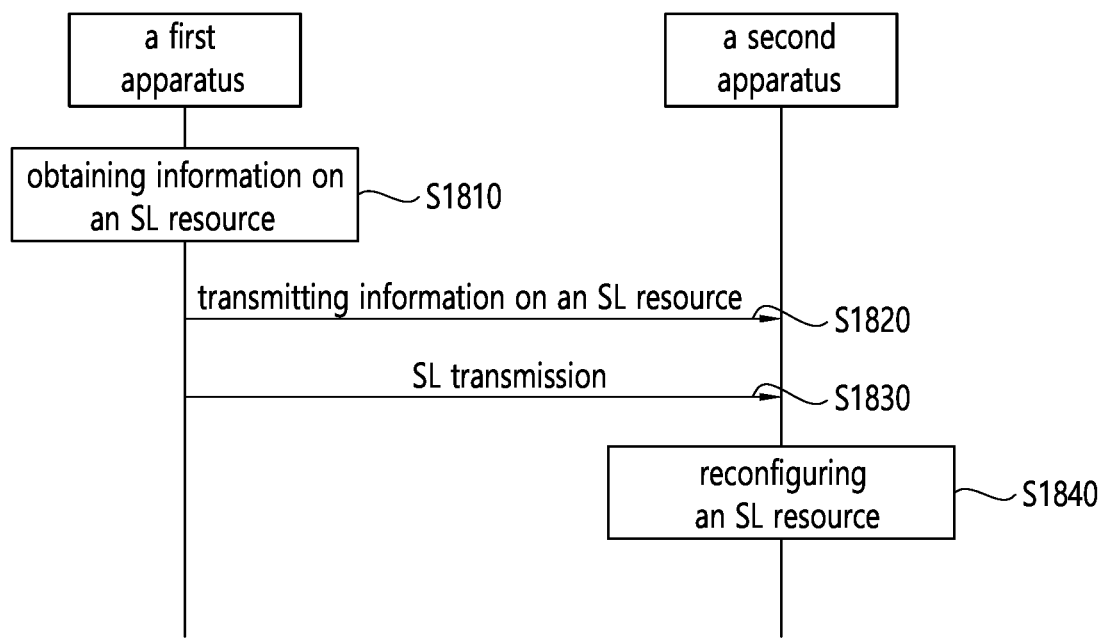
FIG. 18 is a flowchart illustrating a process in which a second apparatus reconfigures an SL resource according to an embodiment of the present disclosure.

FIG. 18 is a flowchart illustrating a process in which a second apparatus reconfigures an SL resource according to an embodiment of the present disclosure.

In one embodiment, the uplink resource indicated by the TDD-UL-DL configuration information may be a downlink resource or a flexible resource in the Uu link SFI. It may include a case where TDD-UL-DL configuration information is not propagated from other terminals. In this case, the introduction of a resolution procedure may be considered.

Steps S1810 and S1820 of FIG. 18 are the same as steps S1710 and S1720 of FIG. 17, and thus a detailed description thereof will be omitted.

In step S1820, the second apparatus according to an embodiment may transmit sidelink data (eg, PSCCH/PSSCH) to the first apparatus based on the information on the SL resource. Specifically, the second apparatus may perform SL transmission on an SL resource determined based on information on the SL resource. In the embodiment of FIG. 18, it is assumed that the second apparatus performs SL transmission using a resource that is not suitable as a sidelink (ie, a resource configured as a downlink or a flexible resource in reality).

Therefore, during a predefined or (pre) configured time interval or transmission number, the second apparatus cannot receive a response signal (eg, physical sidelink feedback channel (PSFCH), PSCCH and/or PSSCH) from the first apparatus. In this case, the second apparatus may determine that the SL resource determined based on the information on the SL resource may be a resource unsuitable for SL transmission.

Accordingly, in step S1830, the second apparatus may reconfigure the SL resource. Specifically, the second apparatus may reconfigure the SL resource determined based on the information on the SL resource to a resource other than the SL purpose.

Alternatively, although not shown in FIG. 18, when another apparatus (eg, a third apparatus) that had received the TDD-UL-DL configuration information from the Uu link has received the PSCCH/PSSCH transmitted by the second apparatus on a resource that is not suitable to the sidelink, the third apparatus may transmit information for updating the SL resource to the second apparatus (via PSBCH or PSCCH/PSSCH). In this case, in step S1830, the second apparatus may reconfigure the SL resource. Specifically, the second apparatus may reconfigure the SL resource determined based on the information on the SL resource to a resource other than the SL purpose.

According to an embodiment of the present disclosure, the terminal can efficiently inform other terminals of information about the SL resource. Furthermore, the terminal may determine that a specific SL resource is a resource unsuitable for SL transmission based on the presence or absence of feedback from another terminal, and the terminal may reconfigure the resource unsuitable for SL transmission to a resource for another purpose.

Figure 19:
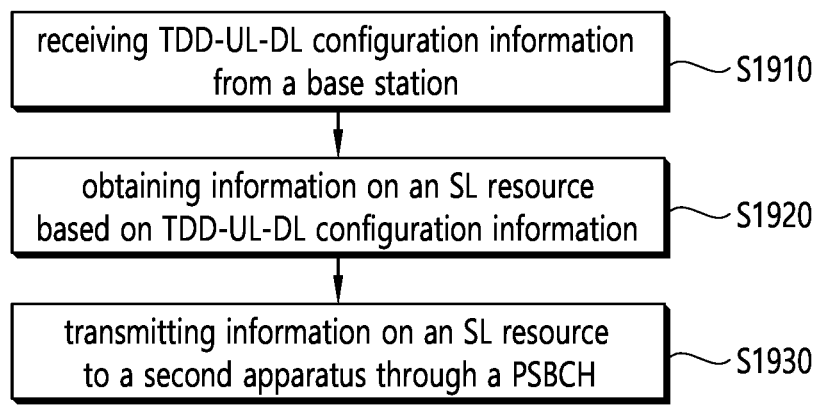
FIG. 19 is a flowchart illustrating an operation of a first apparatus according to an embodiment of the present disclosure.

FIG. 19 is a flowchart illustrating an operation of a first apparatus according to an embodiment of the present disclosure.

The operations disclosed in the flowchart of FIG. 19 may be performed in combination with various embodiments of the present disclosure. In one example, the operations disclosed in the flowchart of FIG. 19 may be performed based on at least one of the apparatuses illustrated in FIGS. 21 to 26. In one example, the first apparatus of FIG. 19 may correspond to the first wireless device 100 of FIG. 22 to be described later. In another example, the first apparatus of FIG. 19 may correspond to the second wireless device 200 of FIG. 22 to be described later.

In step S1910, a first apparatus according to an embodiment may receive time division duplex-uplink-downlink (TDD-UL-DL) configuration information from a base station.

In step S1920, the first apparatus according to an embodiment may obtain information on an SL resource based on the TDD-UL-DL configuration information.

In step S1930, the first apparatus according to an embodiment may transmit the information on the SL resource to a second apparatus through a physical sidelink broadcast channel (PSBCH).

In an embodiment, the SL resource represented by the information on the SL resource may be determined by the base station from among an UL resource represented by information on an UL resource included in the TDD-UL-DL configuration information.

In another embodiment, the first apparatus may determine an SL resource among an UL resource represented by information on an UL resource included in the TDD-UL-DL configuration information.

In an embodiment, the TDD-UL-DL configuration information may further include information on a TDD-UL-DL transmission period. The information on the SL resource may include information on a location of a first SL resource in the TDD-UL-DL transmission period.

In an embodiment, the information on the location of the first SL resource may include at least one of information on a slot number of the first SL resource in the TDD-UL-DL transmission period or information on a symbol number of the first SL resource.

In an embodiment, the first SL resource in the TDD-UL-DL transmission period may include (N−K+1)th slot through Nth slot in the TDD-UL-DL transmission period and (M−L+1)th symbol through Mth symbol of (N−K)th slot. The N may represent a total number of slots included in the TDD-UL-DL transmission period, the K may represent the slot number of the first SL resource, the M may represent a total number of symbols in a slot, and the L may represent the symbol number of the first SL resource.

In an embodiment, the first SL resource in the TDD-UL-DL transmission period may include (N−K+1)th slot through Nth slot except for Mth symbol, and (M−L+1)th symbol through (M−1)th symbol of (N−K)th slot in the TDD-UL-DL transmission period. The Mth symbol of the (N−K+1)th slot through the Nth slot may be determined to an UL resource in the TDD-UL-DL transmission period. The N may represent a total number of slots included in the TDD-UL-DL transmission period, the K may represent the slot number of the first SL resource, the M may represent a total number of symbols in a slot, and the L may represent the symbol number of the first SL resource.

In an embodiment, the first SL resource in the TDD-UL-DL transmission period may include (N−K+1)th slot through Nth slot except for (M−1)th symbol and Mth symbol, and (M−L+1)th symbol through (M−2)th symbol of (N−K)th slot in the TDD-UL-DL transmission period. The (M−1)th symbol and the Mth symbol of the (N−K+1)th slot through the Nth slot in the TDD-UL-DL transmission period may be determined to an UL resource. The N may represent a total number of slots included in the TDD-UL-DL transmission period, the K may represent the slot number of the first SL resource, the M may represent a total number of symbols in a slot, and the L may represent the symbol number of the first SL resource.

In an embodiment, the information on the SL resource may include information on a location of a second SL resource in the TDD-UL-DL transmission period. The information on the location of the second SL resource may include at least one of offset information for indicating a start timing of the second SL resource or an end timing of the second SL resource, information on a slot number of the second SL resource or information on a symbol number of the second SL resource.

In an embodiment, the TDD-UL-DL configuration information may represent TDD-UL-DL configuration common information, TDD-UL-DL configuration dedicated information or dynamic slot format indicator (SFI).

In an embodiment, the TDD-UL-DL configuration information may include TDD-UL-DL pattern indication information. The TDD-UL-DL pattern indication information may include at least one of the information on the TDD-UL-DL transmission period, the information on the slot number of the first SL resource or the information on the symbol number of the first SL resource.

In an embodiment, the TDD-UL-DL configuration information may include TDD-UL-DL pattern indication information for indicating a TDD-UL-DL pattern and information on a TDD-UL-DL transmission period. The TDD-UL-DL pattern indication information (or, information on an SL resource obtained based on the TDD-UL-DL configuration information) may include information on a slot number of the SL resource in the TDD-UL-DL transmission period. The TDD-UL-DL pattern indication information may be represented by X bits of a binary value, the information on the TDD-UL-DL transmission period may be represented by Y bits of a binary code, and the information on the slot number of the SL resource may be represented by Z bits of a binary code. Wherein, the X, the Y and the Z may be positive integers. This embodiment may be illustrated based on the below table 10.

TABLE 10

Proposal 2: The TDD configuration indication is done as follows:
X bits to indicate patterns + Y bits to indicate periodicity + Z bits to indicate UL slots.
FFS the values of X, Y and Z.
Total Z bits to indicate UL slots in pattern 1 and pattern 2 respectively if two patterns are configured.

In an embodiment according to the table 10, the TDD-DL-UL pattern indication information (represented by X bits) may represent at least one of a number of TDD-UL-DL patterns in the TDD-UL-DL transmission period (represented by Y bits) or types of the TDD-UL-DL pattern. If there are two TDD-UL-DL patterns in the TDD-UL-DL transmission period, a sum of Z1 bits for representing a slot number of first SL resource for a first TDD-UL-DL pattern and Z2 bits for representing a slot number of second SL resource for a second TDD-UL-DL pattern may be Z bits.

In another example according to Table 10, information on the number of slots of the SL resource in the TDD-UL-DL transmission period may not be directly indicated, and may be indirectly indicated based on information on the number of the slot of the UL resource in the TDD-UL-DL transmission period. For example, if there are two TDD-UL-DL patterns in the TDD-UL-DL transmission period, there may be ZA bits for indicating the number of slots of the first UL resource for the first TDD-UL-DL pattern and ZB bits for indicating the number of slots of the second UL resource for the second TDD-UL-DL pattern. In this case, the number of slots of the first SL resource in the TDD-UL-DL transmission period may be obtained based on the number of slots of the first UL resource, and the number of slots of the second SL resource in the TDD-UL-DL transmission period may be obtained based on the number of slots of the second UL resource. The sum of the ZA bits and the ZB bits may be Z bits.

In the other example according to Table 10, the base station according to an embodiment may determine the number of slots of the first SL resource based on the number of slots of the first UL resource within the TDD-UL-DL transmission period, and the number of slots of the second SL resource may be determined based on the number of slots of the second UL resource. The base station may transmit TDD-UL-DL configuration information including information on the number of slots of the first SL resource and information on the number of slots of the second SL resource to the terminal (eg, the first apparatus).

In the other example according to Table 10, the first apparatus according to an embodiment may determine the number of slots of the first SL resource and the number of slots of the second SL resource, respectively, based on information on the number of slots of the first UL resource and the second UL included in the TDD-UL-DL configuration information received from the base station.

In an embodiment, the information on the slot number of the first SL resource may be represented by N1 bits of a binary value, the information on the symbol number of the first SL resource may be represented by N2 bits of a binary value, the information on the slot number of the second SL resource may be represented by N3 bits of a binary value, and the information on the symbol number of the second SL resource may be represented by N4 bits of a binary value. The N1, the N2, the N3 and the N4 may be positive integers.

In an embodiment, the information on the SL resource may be represented by N bits of a binary value, the N may be a positive integer. At least one of the information on the slot number of the first SL resource, the information on the symbol number of the first SL resource, the information on the slot number of the second SL resource, the information on the symbol number of the second SL resource, or the offset information may be determined based on the N bits of the binary value and a pre-configuration by the base station.

According to an embodiment of the present disclosure, a first apparatus transmitting information on an SL resource may be provided. The first apparatus may include: at least one memory storing instructions, at least one transceiver and at least one processor connecting the at least one memory and the at least one transceiver, wherein the at least one processor is configured to: control the at least one transceiver to receive time division duplex-uplink-downlink (TDD-UL-DL) configuration information from a base station, obtain information on an SL resource based on the TDD-UL-DL configuration information, and control the at least one transceiver to transmit the information on the SL resource to a second apparatus through a physical sidelink broadcast channel (PSBCH).

According to an embodiment of the present disclosure, an apparatus (or a chip (set)) for controlling the first terminal may be provided. The apparatus may include: at least one processor and at least one computer memory operably coupled by the at least one processor and storing instructions, wherein, by the at least one processor executing the instructions, the first terminal is configured to: receive time division duplex-uplink-downlink (TDD-UL-DL) configuration information from a base station, obtain information on an SL resource based on the TDD-UL-DL configuration information, and transmit the information on the SL resource to a second apparatus through a physical sidelink broadcast channel (PSBCH).

In one example, the first terminal of the embodiment may refer to the first apparatus described throughout the present disclosure. In one example, each of the at least one processor, the at least one memory, and the like in the apparatus for controlling the first terminal may be implemented as a separate sub chip, or at least two or more components may be implemented through a sub-chip.

According to an embodiment of the present disclosure, a non-transitory computer-readable storage medium storing instructions may be provided. Based on the instructions being executed by at least one processor of the non-transitory computer-readable storage medium: time division duplex-uplink-downlink (TDD-UL-DL) configuration information is received by a first apparatus from a base station, information on an SL resource is obtained by the first apparatus based on the TDD-UL-DL configuration information, and the information on the SL resource is transmitted by the first apparatus to a second apparatus through a physical sidelink broadcast channel (PSBCH).

Figure 20:
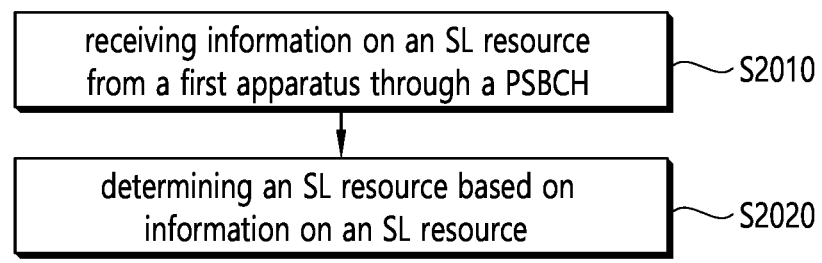
FIG. 20 is a flowchart illustrating an operation of a second apparatus according to an embodiment of the present disclosure.

FIG. 20 is a flowchart illustrating an operation of a second apparatus according to an embodiment of the present disclosure.

The operations disclosed in the flowchart of FIG. 20 may be performed in combination with various embodiments of the present disclosure. In one example, the operations disclosed in the flowchart of FIG. 20 may be performed based on at least one of the apparatuses illustrated in FIGS. 21 to 26. In one example, the second apparatus of FIG. 20 may correspond to the second wireless device 200 of FIG. 22, which will be described later. In another example, the second apparatus of FIG. 20 may correspond to the first wireless device 100 of FIG. 22, which will be described later.

In step S2010, the second apparatus according to an embodiment may receive information on an SL resource from a first apparatus through a physical sidelink broadcast channel (PSBCH).

In step S2020, the second apparatus according to an embodiment may determine the SL resource based on the information on the SL resource.

In an embodiment, the information on the SL resource may be based on TDD-UL-DL configuration information that is received by the first apparatus from a base station.

In an embodiment, the TDD-UL-DL configuration information may further include information on a TDD-UL-DL transmission period. In an embodiment, the information on the SL resource may include information on a location of the SL resource in the TDD-UL-DL transmission period.

In an embodiment, the SL resource represented by the information on the SL resource may be determined by the base station from among an UL resource represented by information on an UL resource included in the TDD-UL-DL configuration information.

In another embodiment, the first apparatus may determine an SL resource among an UL resource represented by information on an UL resource included in the TDD-UL-DL configuration information.

In an embodiment, the information on the location of the first SL resource may include at least one of information on a slot number of the first SL resource in the TDD-UL-DL transmission period or information on a symbol number of the first SL resource.

In an embodiment, the first SL resource in the TDD-UL-DL transmission period may include (N−K+1)th slot through Nth slot in the TDD-UL-DL transmission period and (M−L+1)th symbol through Mth symbol of (N−K)th slot. The N may represent a total number of slots included in the TDD-UL-DL transmission period, the K may represent the slot number of the first SL resource, the M may represent a total number of symbols in a slot, and the L may represent the symbol number of the first SL resource.

In an embodiment, the first SL resource in the TDD-UL-DL transmission period may include (N−K+1)th slot through Nth slot except for Mth symbol, and (M−L+1)th symbol through (M−1)th symbol of (N−K)th slot in the TDD-UL-DL transmission period. The Mth symbol of the (N−K+1)th slot through the Nth slot may be determined to an UL resource in the TDD-UL-DL transmission period. The N may represent a total number of slots included in the TDD-UL-DL transmission period, the K may represent the slot number of the first SL resource, the M may represent a total number of symbols in a slot, and the L may represent the symbol number of the first SL resource.

In an embodiment, the first SL resource in the TDD-UL-DL transmission period may include (N−K+1)th slot through Nth slot except for (M−1)th symbol and Mth symbol, and (M−L+1)th symbol through (M−2)th symbol of (N−K)th slot in the TDD-UL-DL transmission period. The (M−1)th symbol and the Mth symbol of the (N−K+1)th slot through the Nth slot in the TDD-UL-DL transmission period may be determined to an UL resource. The N may represent a total number of slots included in the TDD-UL-DL transmission period, the K may represent the slot number of the first SL resource, the M may represent a total number of symbols in a slot, and the L may represent the symbol number of the first SL resource.

In an embodiment, the information on the SL resource may include information on a location of a second SL resource in the TDD-UL-DL transmission period. The information on the location of the second SL resource may include at least one of offset information for indicating a start timing of the second SL resource or an end timing of the second SL resource, information on a slot number of the second SL resource or information on a symbol number of the second SL resource.

In an embodiment, the TDD-UL-DL configuration information may represent TDD-UL-DL configuration common information, TDD-UL-DL configuration dedicated information or dynamic slot format indicator (SFI).

In an embodiment, the TDD-UL-DL configuration information may include TDD-UL-DL pattern indication information. The TDD-UL-DL pattern indication information may include at least one of the information on the TDD-UL-DL transmission period, the information on the slot number of the first SL resource or the information on the symbol number of the first SL resource.

In an embodiment, the TDD-UL-DL configuration information may include TDD-UL-DL pattern indication information for indicating a TDD-UL-DL pattern and information on a TDD-UL-DL transmission period. The TDD-UL-DL pattern indication information (or, information on an SL resource obtained based on the TDD-UL-DL configuration information) may include information on a slot number of the SL resource in the TDD-UL-DL transmission period. The TDD-UL-DL pattern indication information may be represented by X bits of a binary value, the information on the TDD-UL-DL transmission period may be represented by Y bits of a binary code, and the information on the slot number of the SL resource may be represented by Z bits of a binary code. Wherein, the X, the Y and the Z may be positive integers. This embodiment may be illustrated based on the below table 11.

TABLE 11

Proposal 2: The TDD configuration indication is done as follows:
X bits to indicate patterns + Y bits to indicate periodicity + Z bits to indicate UL slots.
FFS the values of X, Y and Z.
Total Z bits to indicate UL slots in pattern 1 and pattern 2 respectively if two patterns are configured.

In an embodiment according to the table 11, the TDD-DL-UL pattern indication information (represented by X bits) may represent at least one of a number of TDD-UL-DL patterns in the TDD-UL-DL transmission period (represented by Y bits) or types of the TDD-UL-DL pattern. If there are two TDD-UL-DL patterns in the TDD-UL-DL transmission period, a sum of Z1 bits for representing a slot number of first SL resource for a first TDD-UL-DL pattern and Z2 bits for representing a slot number of second SL resource for a second TDD-UL-DL pattern may be Z bits.

In another example according to Table 11, information on the number of slots of the SL resource in the TDD-UL-DL transmission period may not be directly indicated, and may be indirectly indicated based on information on the number of the slot of the UL resource in the TDD-UL-DL transmission period. For example, if there are two TDD-UL-DL patterns in the TDD-UL-DL transmission period, there may be ZA bits for indicating the number of slots of the first UL resource for the first TDD-UL-DL pattern and ZB bits for indicating the number of slots of the second UL resource for the second TDD-UL-DL pattern. In this case, the number of slots of the first SL resource in the TDD-UL-DL transmission period may be obtained based on the number of slots of the first UL resource, and the number of slots of the second SL resource in the TDD-UL-DL transmission period may be obtained based on the number of slots of the second UL resource. The sum of the ZA bits and the ZB bits may be Z bits.

In the other example according to Table 11, the base station according to an embodiment may determine the number of slots of the first SL resource based on the number of slots of the first UL resource within the TDD-UL-DL transmission period, and the number of slots of the second SL resource may be determined based on the number of slots of the second UL resource. The base station may transmit TDD-UL-DL configuration information including information on the number of slots of the first SL resource and information on the number of slots of the second SL resource to the terminal (eg, the first apparatus).

In the other example according to Table 11, the first apparatus according to an embodiment may determine the number of slots of the first SL resource and the number of slots of the second SL resource, respectively, based on information on the number of slots of the first UL resource and the second UL included in the TDD-UL-DL configuration information received from the base station.

In an embodiment, the information on the slot number of the first SL resource may be represented by N1 bits of a binary value, the information on the symbol number of the first SL resource may be represented by N2 bits of a binary value, the information on the slot number of the second SL resource may be represented by N3 bits of a binary value, and the information on the symbol number of the second SL resource may be represented by N4 bits of a binary value. The N1, the N2, the N3 and the N4 may be positive integers.

In an embodiment, the information on the SL resource may be represented by N bits of a binary value, the N may be a positive integer. At least one of the information on the slot number of the first SL resource, the information on the symbol number of the first SL resource, the information on the slot number of the second SL resource, the information on the symbol number of the second SL resource, or the offset information may be determined based on the N bits of the binary value and a pre-configuration by the base station.

According to an embodiment of the present disclosure, a second apparatus receiving information on an SL resource may be provided. The second apparatus may include at least one memory storing instructions, at least one transceiver and at least one processor connecting the at least one memory and the at least one transceiver, wherein the at least one processor is configured to: control the at least one transceiver to receive information on an SL resource from a first apparatus through a physical sidelink broadcast channel (PSBCH), and determine the SL resource based on the information on the SL resource, wherein the information on the SL resource is based on TDD-UL-DL configuration information that is received by the first apparatus from a base station.

Various embodiments of the present disclosure may be independently implemented. Alternatively, the various embodiments of the present disclosure may be implemented by being combined or merged. For example, although the various embodiments of the present disclosure have been described based on the 3GPP LTE system for convenience of explanation, the various embodiments of the present disclosure may also be extendedly applied to another system other than the 3GPP LTE system. For example, the various embodiments of the present disclosure may also be used in an uplink or downlink case without being limited only to direct communication between terminals. In this case, a base station, a relay node, or the like may use the proposed method according to various embodiments of the present disclosure. For example, it may be defined that information on whether to apply the method according to various embodiments of the present disclosure is reported by the base station to the terminal or by a transmitting terminal to a receiving terminal through pre-defined signaling (e.g., physical layer signaling or higher layer signaling). For example, it may be defined that information on a rule according to various embodiments of the present disclosure is reported by the base station to the terminal or by a transmitting terminal to a receiving terminal through pre-defined signaling (e.g., physical layer signaling or higher layer signaling). For example, some embodiments among various embodiments of the present disclosure may be applied limitedly only to a resource allocation mode 1. For example, some embodiments among various embodiments of the present disclosure may be applied limitedly only to a resource allocation mode 2.

Hereinafter, an apparatus to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

FIG. 17 shows a communication system 1, in accordance with an embodiment of the present disclosure.

Referring to FIG. 17, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an extended Reality (XR) device 100c, a hand-held device 100d, a home appliance 100e, an Internet of Things (IOT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

FIG. 18 shows wireless devices, in accordance with an embodiment of the present disclosure.

Referring to FIG. 18, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 17.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other apparatuses. The one or more transceivers 106 and 206 may receive user data, control information, and/or radio signals/channels, mentioned in the descriptions, functions, procedures, proposals, methods, and/or operational flowcharts disclosed in this document, from one or more other apparatuses. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other apparatuses. In addition, the one or more processors 102 and 202 may perform control so that the one or more transceivers 106 and 206 may receive user data, control information, or radio signals from one or more other apparatuses. In addition, the one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

FIG. 19 shows a signal process circuit for a transmission signal, in accordance with an embodiment of the present disclosure.

Referring to FIG. 19, a signal processing circuit 1000 may include scramblers 1010, modulators 1020, a layer mapper 1030, a precoder 1040, resource mappers 1050, and signal generators 1060. An operation/function of FIG. 19 may be performed by, without being limited to, the processors 102 and 202 and/or the transceivers 106 and 206 of FIG. 18. Hardware elements of FIG. 19 may be implemented by the processors 102 and 202 and/or the transceivers 106 and 206 of FIG. 18. For example, blocks 1010 to 1060 may be implemented by the processors 102 and 202 of FIG. 18. Alternatively, the blocks 1010 to 1050 may be implemented by the processors 102 and 202 of FIG. 18 and the block 1060 may be implemented by the transceivers 106 and 206 of FIG. 18.

Codewords may be converted into radio signals via the signal processing circuit 1000 of FIG. 19. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 19. For example, the wireless devices (e.g., 100 and 200 of FIG. 18) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

FIG. 20 shows a wireless device, in accordance with an embodiment of the present disclosure. The wireless device may be implemented in various forms according to a use-case/service (see FIG. 17).

Referring to FIG. 20, wireless devices 100 and 200 may correspond to the wireless devices 100 and 200 of FIG. 18 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 18. For example, the transceiver(s) 114 may include the one or more transceivers 106 and 206 and/or the one or more antennas 108 and 208 of FIG. 18. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. In addition, the control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 17), the vehicles (100b-1 and 100b-2 of FIG. 17), the XR device (100c of FIG. 17), the hand-held device (100d of FIG. 17), the home appliance (100e of FIG. 17), the IoT device (100f of FIG. 17), a digital broadcast terminal, a hologram device, a public safety device, an MTC device, a medicine device, a fintech device (or a finance device), a security device, a climate/environment device, the AI server/device (400 of FIG. 17), the BSs (200 of FIG. 17), a network node, etc. The wireless device may be used in a mobile or fixed place according to a use-example/service.

In FIG. 20, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 20 will be described in detail with reference to the drawings.

Figure 21:
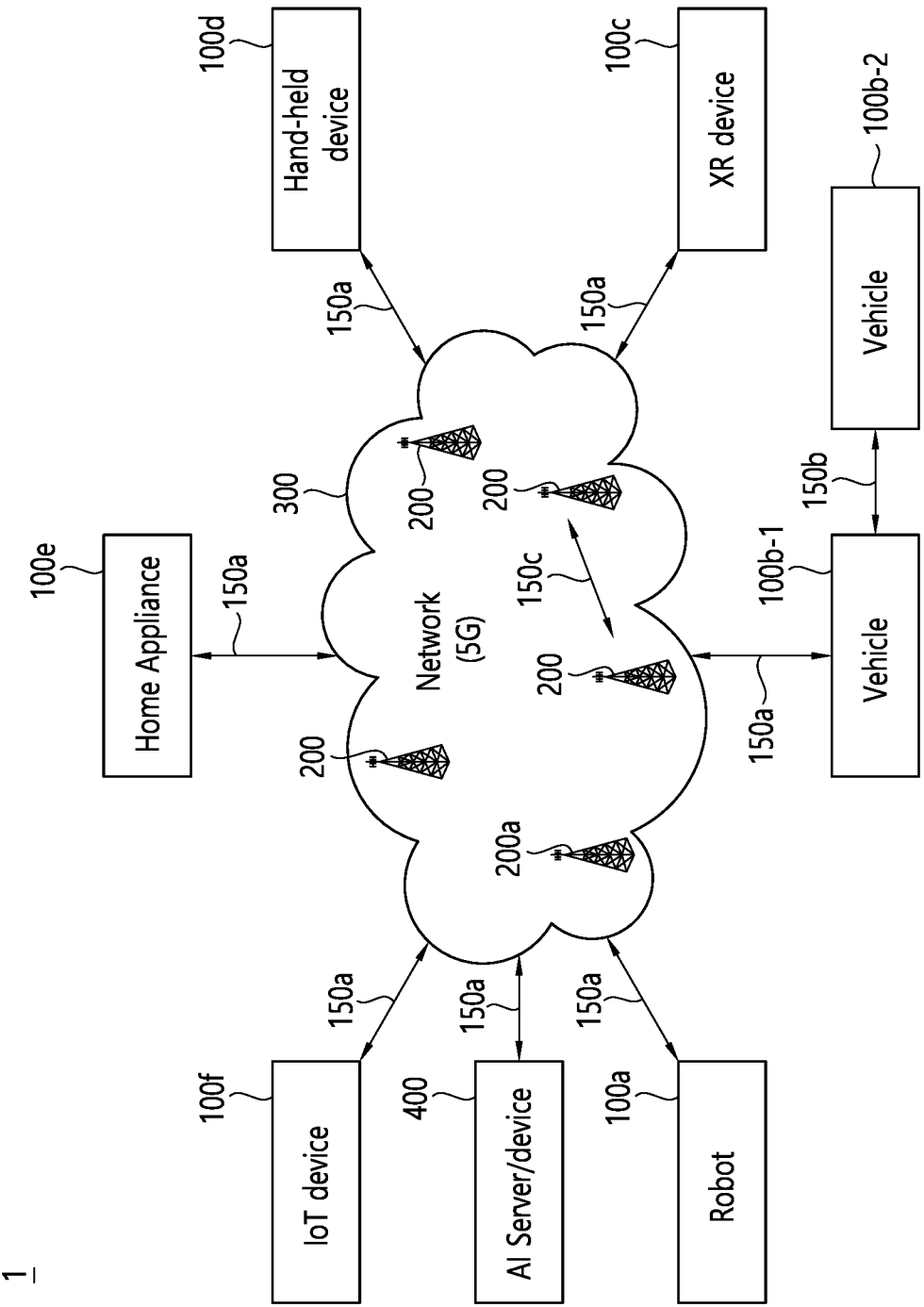
FIG. 21 shows a communication system 1, in accordance with an embodiment of the present disclosure.

FIG. 21 shows a hand-held device, in accordance with an embodiment of the present disclosure. The hand-held device may include a smartphone, a smartpad, a wearable device (e.g., a smartwatch or a smartglasses), or a portable computer (e.g., a notebook). The hand-held device may be referred to as a Mobile Station (MS), a User Terminal (UT), a Mobile Subscriber Station (MSS), a Subscriber Station (SS), an Advanced Mobile Station (AMS), or a Wireless Terminal (WT).

Referring to FIG. 21, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. X3, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. In addition, the memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 22:
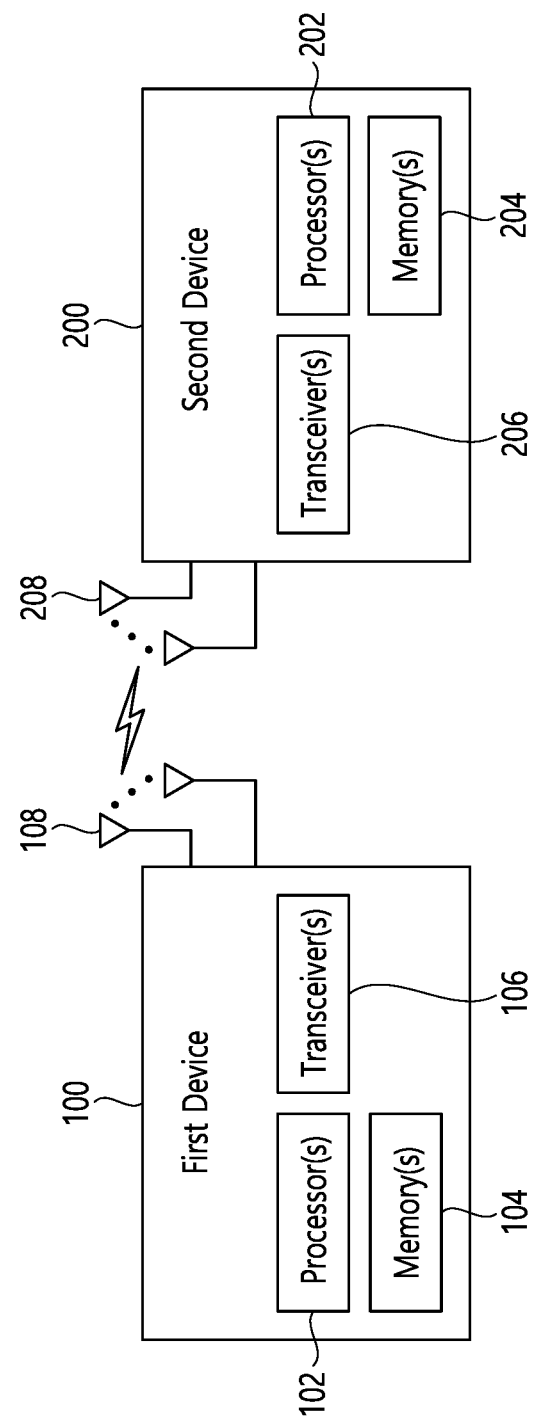
FIG. 22 shows wireless devices, in accordance with an embodiment of the present disclosure.
Figure 23:
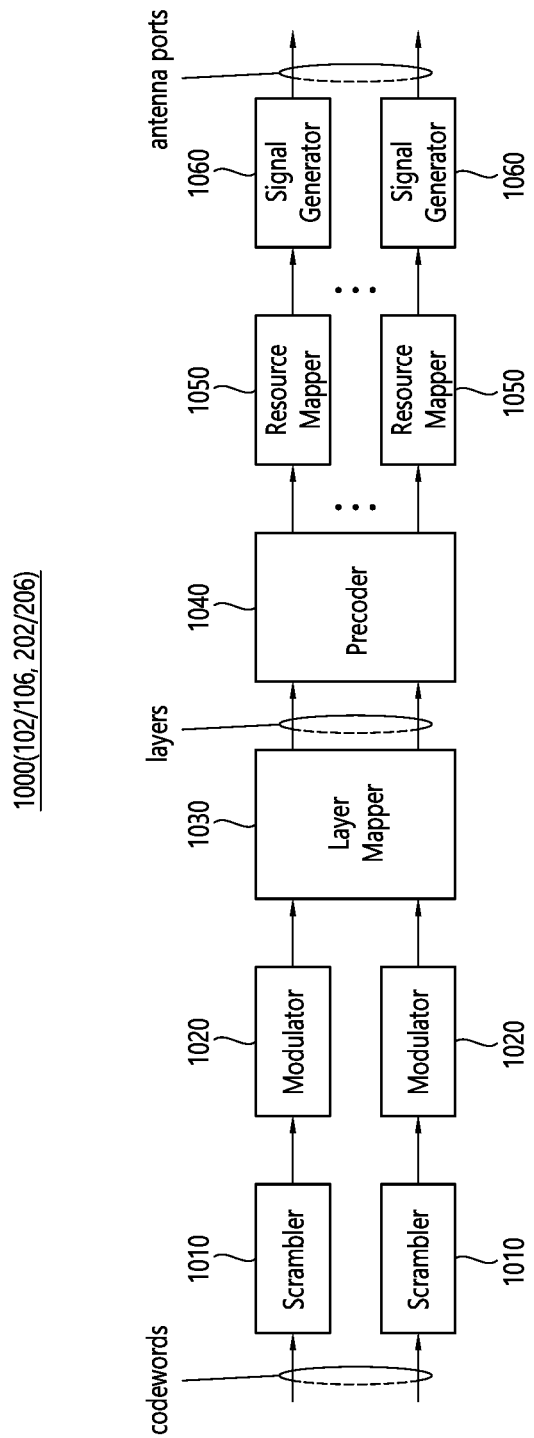
FIG. 23 shows a signal process circuit for a transmission signal, in accordance with an embodiment of the present disclosure.
Figure 24:
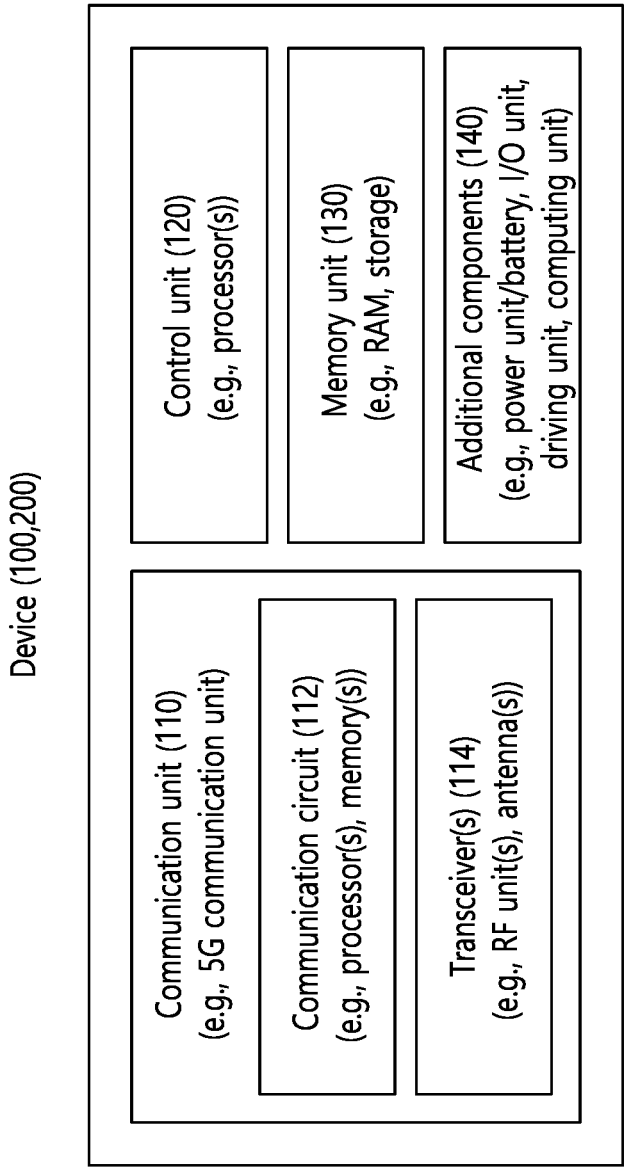
FIG. 24 shows a wireless device, in accordance with an embodiment of the present disclosure.
Figure 25:
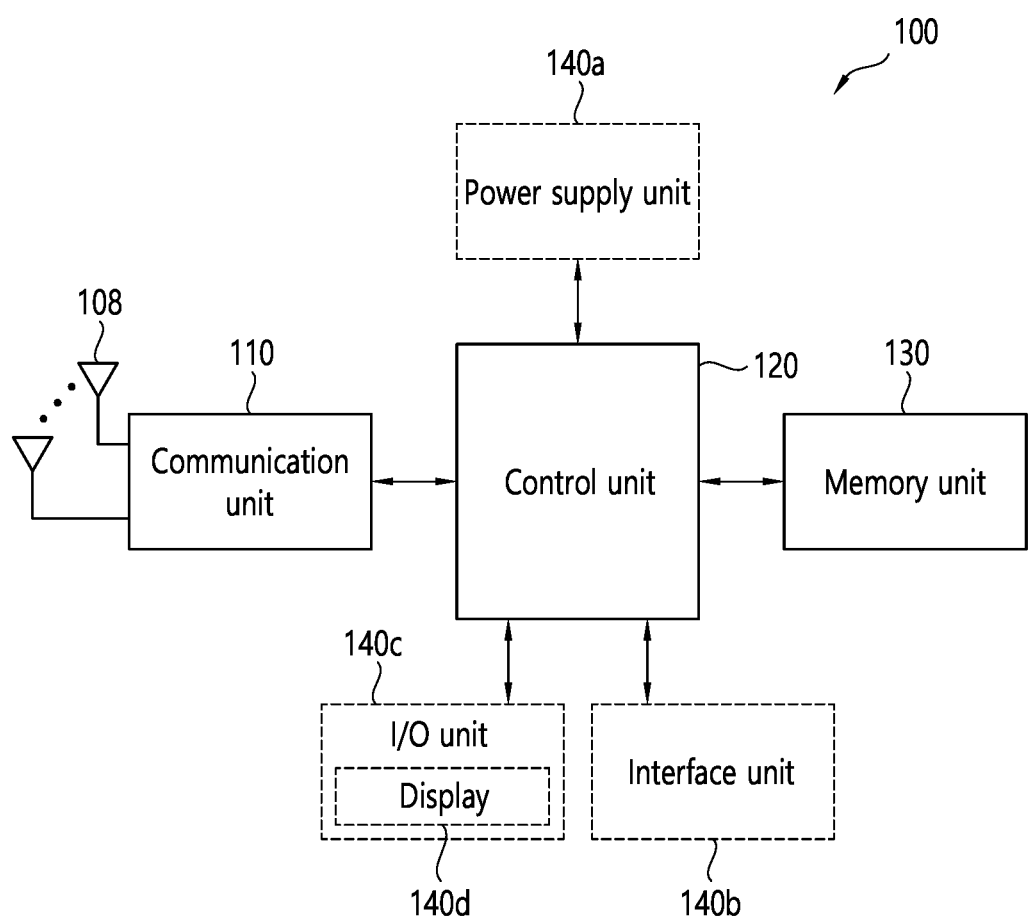
FIG. 25 shows a hand-held device, in accordance with an embodiment of the present disclosure.
Figure 26:
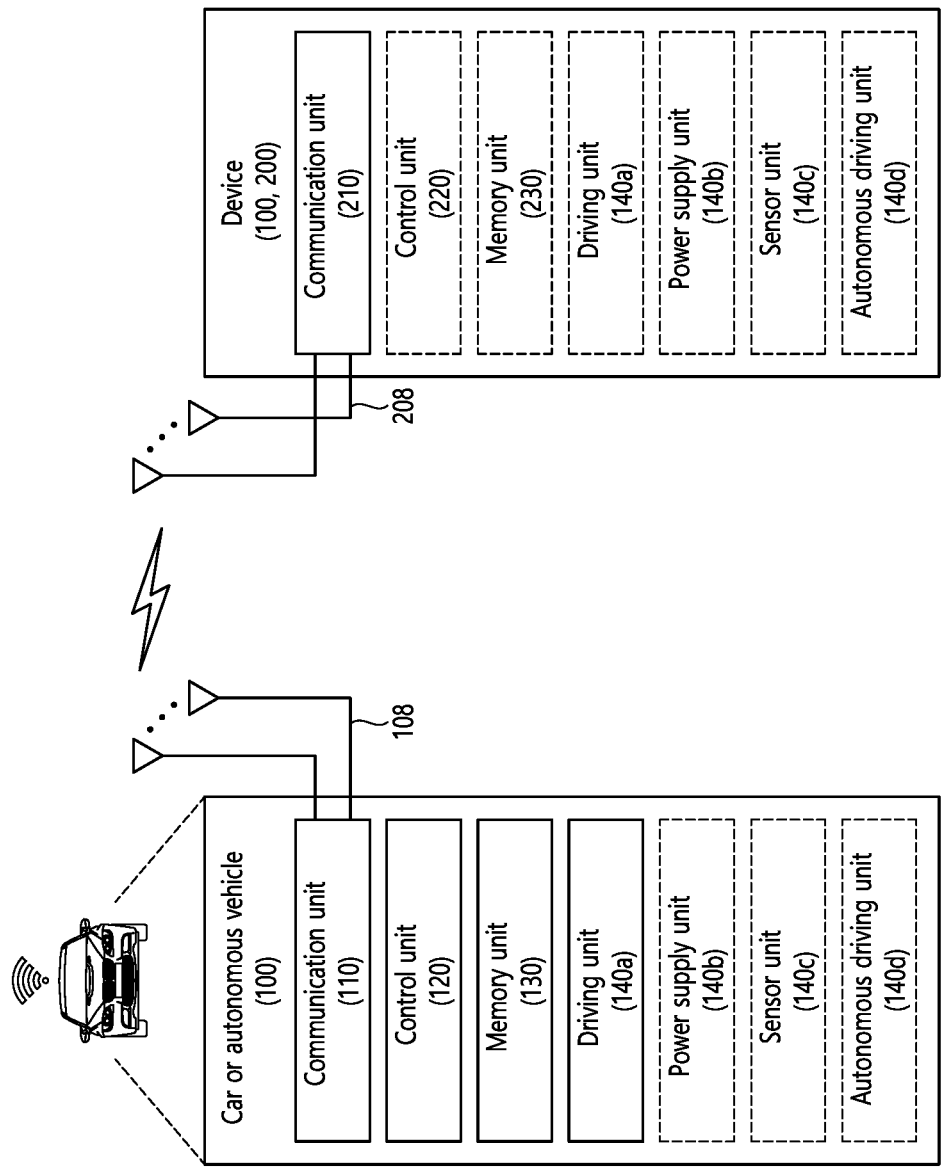
FIG. 26 shows a car or an autonomous vehicle, in accordance with an embodiment of the present disclosure.

FIG. 22 shows a car or an autonomous vehicle, in accordance with an embodiment of the present disclosure. The car or autonomous vehicle may be implemented by a mobile robot, a car, a train, a manned/unmanned Aerial Vehicle (AV), a ship, etc.

Referring to FIG. 22, a car or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 19, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In addition, in the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

The scope of the disclosure may be represented by the following claims, and it should be construed that all changes or modifications derived from the meaning and scope of the claims and their equivalents may be included in the scope of the disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method comprising:
obtaining time division duplex-uplink-downlink (TDD-UL-DL) configuration information including information related to a first pattern including information related to a number of first UL slots, information related to a second pattern including information related to a number of second UL slots, and information related to a reference subcarrier spacing (SCS);
obtaining a number of sidelink (SL) slots related to the first pattern or the second pattern based on the number of first UL slots, the number of second UL slots, and the reference SCS; and
transmitting, to a second device, information related to the number of SL slots via a physical sidelink broadcast channel (PSBCH).

2. The method of claim 1,
wherein the TDD-UL-DL configuration information is received from a base station.

3. The method of claim 1,
wherein the TDD-UL-DL configuration information is pre-configured.

4. The method of claim 1,
wherein the information related to the first pattern includes information related to a number of first SL symbols, and
wherein the information related to the second pattern includes information related to a number of second SL symbols.

5. The method of claim 4,
wherein the number of SL slots is obtained based on the number of first UL slots, a number of first UL symbols, the number of second UL slots, a number of second UL symbols, and the reference SCS.

6. The method of claim 1,
wherein the information related to the first pattern includes information related to a first period, and
wherein the information related to the second pattern includes information related to a second period.

7. The method of claim 6,
wherein the information related to the first period and the information related to the second period are transmitted via the PSBCH.

8. A first device comprising:
at least one transceiver;
at least one processor; and
at least one memory connected to the at least one processor and storing instructions that, based on being executed by the at least one processor, cause the first device to perform operations comprising:
obtaining time division duplex-uplink-downlink (TDD-UL-DL) configuration information including information related to a first pattern including information related to a number of first UL slots, information related to a second pattern including information related to a number of second UL slots, and information related to a reference subcarrier spacing (SCS);
obtaining a number of sidelink (SL) slots related to the first pattern or the second pattern based on the number of first UL slots, the number of second UL slots, and the reference SCS; and
transmitting, to a second device, information related to the number of SL slots via a physical sidelink broadcast channel (PSBCH).

9. The first device of claim 8,
wherein the TDD-UL-DL configuration information is received from a base station.

10. The first device of claim 8,
wherein the TDD-UL-DL configuration information is pre-configured.

11. The first device of claim 8,
wherein the information related to the first pattern includes information related to a number of first SL symbols, and
wherein the information related to the second pattern includes information related to a number of second SL symbols.

12. The first device of claim 11,
wherein the number of SL slots is obtained based on the number of first UL slots, a number of first UL symbols, the number of second UL slots, a number of second UL symbols, and the reference SCS.

13. The first device of claim 8,
wherein the information related to the first pattern includes information related to a first period, and
wherein the information related to the second pattern includes information related to a second period.

14. The first device of claim 13,
wherein the information related to the first period and the information related to the second period are transmitted via the PSBCH.

15. A processing device adapted to control a first device, comprising:
at least one processor; and
at least one memory connected to the at least one processor and storing instructions that, based on being executed by the at least one processor, cause the first device to perform operations comprising:
obtaining time division duplex-uplink-downlink (TDD-UL-DL) configuration information including information related to a first pattern including information related to a number of first UL slots, information related to a second pattern including information related to a number of second UL slots, and information related to a reference subcarrier spacing (SCS);
obtaining a number of sidelink (SL) slots related to the first pattern or the second pattern based on the number of first UL slots, the number of second UL slots, and the reference SCS; and
transmitting, to a second device, information related to the number of SL slots via a physical sidelink broadcast channel (PSBCH).

16. The processing device of claim 15,
wherein the TDD-UL-DL configuration information is received from a base station.

17. The processing device of claim 15,
wherein the TDD-UL-DL configuration information is pre-configured.

18. The processing device of claim 15,
wherein the information related to the first pattern includes information related to a number of first SL symbols, and
wherein the information related to the second pattern includes information related to a number of second SL symbols.

19. The processing device of claim 18,
wherein the number of SL slots is obtained based on the number of first UL slots, a number of first UL symbols, the number of second UL slots, a number of second UL symbols, and the reference SCS.

20. The processing device of claim 15,
wherein the information related to the first pattern includes information related to a first period,
wherein the information related to the second pattern includes information related to a second period, and
wherein the information related to the first period and the information related to the second period are transmitted via the PSBCH.

\* \* \* \* \*